United States Patent
Higashino et al.

(10) Patent No.: US 7,706,636 B2
(45) Date of Patent: Apr. 27, 2010

(54) IMAGE GENERATION SYSTEM (GAME SYSTEM), IMAGE GENERATION METHOD, PROGRAM AND INFORMATION STORAGE MEDIUM

(75) Inventors: Taichi Higashino, Tokyo (JP); Seidou Ozawa, Tokyo (JP); Takashi Kumakura, Tokyo (JP); Ryo Takahashi, Tokyo (JP); Sei Nakatani, Tokyo (JP); Yoshiyuki Ozaki, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 1071 days.

(21) Appl. No.: 11/385,867

(22) Filed: Mar. 22, 2006

(65) Prior Publication Data
US 2006/0217008 A1 Sep. 28, 2006

(30) Foreign Application Priority Data
Mar. 24, 2005 (JP) .............................. 2005-085318

(51) Int. Cl.
G06K 9/46 (2006.01)
G06K 9/42 (2006.01)
G06K 9/36 (2006.01)
G06K 9/60 (2006.01)
G06F 19/00 (2006.01)
G06T 15/70 (2006.01)

(52) U.S. Cl. ..................... 382/302; 382/190; 382/256; 382/277; 382/291; 382/305; 463/1; 345/418

(58) Field of Classification Search ................. 382/256, 382/277, 302, 291; 463/1
See application file for complete search history.

(56) References Cited

U.S. PATENT DOCUMENTS

| | | | | |
|---|---|---|---|---|
| 4,894,774 | A * | 1/1990 | McCarthy et al. | 463/31 |
| 4,905,147 | A * | 2/1990 | Logg | 463/31 |
| 4,905,168 | A * | 2/1990 | McCarthy et al. | 345/474 |
| 4,930,074 | A * | 5/1990 | McCarthy | 463/31 |
| 5,359,701 | A * | 10/1994 | Fukui et al. | 706/53 |
| 5,566,294 | A * | 10/1996 | Kojima et al. | 715/866 |
| 5,719,592 | A * | 2/1998 | Misawa | 345/667 |
| 5,867,166 | A * | 2/1999 | Myhrvold et al. | 345/419 |
| 6,300,959 | B1 * | 10/2001 | Gabler et al. | 345/473 |
| 6,514,142 | B1 * | 2/2003 | Hattori et al. | 463/31 |
| 6,728,420 | B2 * | 4/2004 | Tsunashima et al. | 382/282 |
| 6,758,752 | B1 * | 7/2004 | Miyagawa | 463/31 |
| 6,847,361 | B1 * | 1/2005 | Kitsutaka | 345/426 |
| 6,949,024 | B2 * | 9/2005 | Kaku et al. | 463/31 |
| 6,952,205 | B2 * | 10/2005 | Kawahara | 345/420 |

(Continued)

FOREIGN PATENT DOCUMENTS

JP A 2003-67767 3/2003

Primary Examiner—Aaron W Carter
Assistant Examiner—Mia M Thomas
(74) Attorney, Agent, or Firm—Oliff & Berridge, PLC

(57) ABSTRACT

A part object which forms a model object is disposed by receiving a disposition direction for the part object and updating slot state data indicating a disposition state of the part object in a part slot provided corresponding to each part object. When another part object has been disposed in the part slot corresponding to the part object for which the disposition direction has been issued, whether or not to update the slot state data of the part slot is determined based on priority information which determines disposition priority of each part object, and the slot state data is updated based on the determination result.

19 Claims, 16 Drawing Sheets

U.S. PATENT DOCUMENTS

| | | | |
|---|---|---|---|
| 7,129,945 B2* | 10/2006 | Ouchi et al. | 345/427 |
| 7,539,606 B2* | 5/2009 | Comair et al. | 703/9 |
| 2002/0052235 A1* | 5/2002 | Hirsch et al. | 463/31 |
| 2002/0090994 A1* | 7/2002 | Kaido et al. | 463/30 |
| 2002/0151360 A1* | 10/2002 | Durham et al. | 463/30 |
| 2002/0160823 A1* | 10/2002 | Watabe et al. | 463/7 |
| 2003/0038800 A1* | 2/2003 | Kawahara | 345/420 |
| 2004/0174366 A1* | 9/2004 | Lenger et al. | 345/473 |
| 2005/0079914 A1* | 4/2005 | Kaido et al. | 463/30 |
| 2005/0207617 A1* | 9/2005 | Sarnoff | 382/103 |
| 2006/0217008 A1* | 9/2006 | Higashino et al. | 439/894 |

* cited by examiner

FIG.4

HUMAN BODY PART SET DATA

| PART SET | SLOT | PRIORITY | OBJECT DATA | VARIATION OBJECT DATA | |
|---|---|---|---|---|---|
| | | | | VARIATION A | VARIATION B |
| HAIR 1 | A1 | 1 | HOB1-A1 | HOB1-A1a | HOB1-A1b |
| HAIR 2 | A1 | 1 | HOB2-A1 | HOB2-A1a | HOB2-A1b |
| --- | --- | --- | --- | --- | --- |
| FACE 1 | A2 | 1 | FOB1-A2 | FOB1-A2a | — |
| FACE 2 | A2 | 1 | FOB2-A2 | FOB2-A2a | — |
| FACE 3 | A2 | --- | FOB3-A2 | FOB3-A2a | — |
| --- | --- | --- | --- | --- | --- |
| HUMAN BODY 1 | A3<br>A4<br>A5<br>--------<br>A13<br>A14 | 1 | NOB1-A3<br>NOB1-A4<br>NOB1-A5<br>--------<br>NOB1-A13<br>NOB1-A14 | NOB1-A3a<br>NOB1-A4a<br>NOB1-A5a<br>--------<br>NOB1-A13a<br>NOB1-A14a | NOB1-A3b<br>NOB1-A4b<br>NOB1-A5b<br>--------<br>NOB1-A13b<br>NOB1-A14b |
| HUMAN BODY 2 | A3<br>A4<br>A5<br>--------<br>A13<br>A14 | 1 | NOB2-A3<br>NOB2-A4<br>NOB2-A5<br>--------<br>NOB2-A13<br>NOB2-A14 | NOB2-A3a<br>NOB2-A4a<br>NOB2-A5a<br>--------<br>NOB2-A13a<br>NOB2-A14a | NOB2-A3b<br>NOB2-A4b<br>NOB2-A5b<br>--------<br>NOB2-A13b<br>NOB2-A14b |
| -------- | --- | -------- | -------- | -------- | -------- |

FIG.5
ORNAMENTAL PART SET DATA

| PART SET | SLOT | PRIORITY | OBJECT DATA | VARIATION OBJECT DATA | | VARIATION SELECTION INFORMATION | MONITOR SLOT | DISPOSITION CLEAR INFORMATION |
|---|---|---|---|---|---|---|---|---|
| | | | | VARIATION A | VARIATION B | | | |
| HAT | A1 | 2 | COB-A1 | — | — | — | — | — |
| BEARD | B2 | 2 | WOB-B2 | WOB-B2a | WOB-B2b | FOB1:A, FOB2:B | A2 | — |
| T-SHIRT 1 | A3<br>A4<br>A8<br>A9 | 2 | JOB1-A3<br>JOB1-A4<br>JOB1-A8<br>JOB1-A9 | — | — | — | — | — |
| T-SHIRT 2 | A3<br>A4<br>A8<br>A9 | 2 | JOB2-A3<br>JOB2-A4<br>JOB2-A8<br>JOB2-A9 | — | — | — | — | — |
| SWEAT SUIT | A3<br>A4<br>A5<br>A6<br>A8<br>A9 | 3 | JOB3-A3<br>JOB3-A4<br>JOB3-A5<br>JOB3-A6<br>JOB3-A8<br>JOB3-A9 | — | — | — | — | — |
| UNIFORM | A4<br>A5<br>A6<br>B3<br>B6 | 4 | JOB4-A4<br>JOB4-A5<br>JOB4-A6<br>JOB4-B3<br>JOB4-B6 | JOB4-A4a<br>JOB4-A5a<br>JOB4-A6a<br>JOB4-B3a<br>JOB4-B6a | — | — | — | A8<br>A9<br>A10 |
| BELT | B7 | 5 | BOB-B7 | — | — | A | — | — |
| ------ | ------ | ------ | ------ | ------ | ------ | ------ | ------ | ------ |

FIG.6A

NAKED

| SLOT | DISPOSITION STATE |
|---|---|
| A1 | HOB1-A1 |
| A2 | FOB1-A2 |
| A3 | NOB1-A3 |
| A4 | NOB1-A4 |
| A5 | NOB1-A5 |
| A6 | NOB1-A6 |
| A7 | NOB1-A7 |
| A8 | NOB1-A8 |
| A9 | NOB1-A9 |
| A10 | NOB1-A10 |
| A11 | NOB1-A11 |
| A12 | NOB1-A12 |
| A13 | NOB1-A13 |
| A14 | NOB1-A14 |
| B1 | NULL |
| B2 | NULL |
| B3 | NULL |
| B4 | NULL |
| B5 | NULL |
| B6 | NULL |
| B7 | NULL |
| B8 | NULL |
| B9 | NULL |
| B10 | NULL |

FIG.6B

WEARING T-SHIRT 1

| SLOT | DISPOSITION STATE |
|---|---|
| A1 | HOB1-A1 |
| A2 | FOB1-A2 |
| A3 | JOB1-A3 |
| A4 | JOB1-A4 |
| A5 | NOB1-A5 |
| A6 | NOB1-A6 |
| A7 | NOB1-A7 |
| A8 | JOB1-A8 |
| A9 | JOB1-A9 |
| A10 | NOB1-A10 |
| A11 | NOB1-A11 |
| A12 | NOB1-A12 |
| A13 | NOB1-A13 |
| A14 | NOB1-A14 |
| B1 | NULL |
| B2 | NULL |
| B3 | NULL |
| B4 | NULL |
| B5 | NULL |
| B6 | NULL |
| B7 | NULL |
| B8 | NULL |
| B9 | NULL |
| B10 | NULL |

FIG.6C

WEARING UNIFORM OVER T-SHIRT 1

| SLOT | DISPOSITION STATE |
|---|---|
| A1 | HOB1-A1 |
| A2 | FOB1-A2 |
| A3 | JOB1-A3 |
| A4 | JOB4-A4 |
| A5 | JOB4-A5 |
| A6 | JOB4-A6 |
| A7 | NOB1-A7 |
| A8 | NULL |
| A9 | NULL |
| A10 | NULL |
| A11 | NOB1-A11 |
| A12 | NOB1-A12 |
| A13 | NOB1-A13 |
| A14 | NOB1-A14 |
| B1 | NULL |
| B2 | NULL |
| B3 | JOB4-B3 |
| B4 | NULL |
| B5 | NULL |
| B6 | JOB4-B6 |
| B7 | NULL |
| B8 | NULL |
| B9 | NULL |
| B10 | NULL |

CHANGES DISPOSITION IN SLOT UNITS

BEFORE CHANGE    AFTER CHANGE

BEFORE CHANGE    AFTER CHANGE

Image Generation System (Game System), Image Generation Method, Program and Information Storage Medium Japanese Patent Application No. 2005-85318, filed on Mar. 24, 2005, is hereby incorporated by reference in its entirety.

BACKGROUND OF TEE INVENTION

The present invention relates to a program, an information storage medium, an image generation system, and an image generation method.

An image generation system (game system) has been known which generates an image viewed from a virtual camera (given viewpoint) in an object space (virtual three-dimensional space) Such an image generation system is very popular as a system which allows experience of so-called virtual reality. For example, an image generation system which produces a fighting game (competitive action game) allows a player to enjoy the game by operating a player's character player's object) using an operation section (e.g. controller, lever, or button) and fighting against an enemy character (enemy object) operated by a computer or another player. In such an image generation system, it is desirable that the player's character be customized corresponding to the preference of the player. This strongly prompts the player to play the game.

However, a known image generation system which enables such character customization allows only part of the character model provided in advance to be customized by changing the parts of the model. Specifically, a known image generation system cannot sufficiently satisfy the user's demand due to limited variations of customization.

When allowing the player to customize the character by overlapping the parts, the method of changing the parts of the model makes it necessary to provide object data after overlapping the parts. Therefore, it is necessary to provide an enormous amount of object data when pursuing a wide range of customization. Moreover, the processing load is increased.

SUMMARY

According to a first aspect of the invention, there is provided a program used for generating an images the program causing a computer to function as:

an object data storage section which stores object data corresponding to each part object of a model object formed by a plurality of part objects;

a slot state data storage section which stores a disposition state of the part object in a part slot provided corresponding to each of the part objects as slot state data;

a disposition direction reception section which receives a disposition direction for the part object;

a slot state update section which, when another part object has been disposed in the part slot corresponding to the part object for which the disposition direction has been issued, determines whether or not to update the slot state data of the part slot based on priority information which determines disposition priority of each of the part objects, and updates the slot state data based on a determination result; and an image generation section which acquires the object data from the object data storage section based on the updated slot state data, and generates an image of the model object based on the acquired object data.

According to a second aspect of the invention, there is provided a program used for generating an image, the program causing a computer to function as:

an object data storage section which stores object data corresponding to each part object of a model object formed by a plurality of part objects;

a slot state data storage section which stores a disposition state of the part object in a part slot provided corresponding to each of the part objects as slot state data;

a disposition direction reception section which receives a disposition direction for the part object using a part set including one or more of the part objects disposed in one or more of the part slots as a direction unit;

a slot state update section which updates the slot state data based on priority information which determines disposition priority of the part object included in the part set; and an image generation section which acquires the object data from the object data storage section based on the updated slot state data, and generates an image of the model object based on the acquired object data.

According to a third aspect of the invention, there is provided a computer-readable information storage medium storing any of the above-described programs.

According to a fourth aspect of the invention, there is provided an image generation system which generates an image, the image generation system comprising:

an object data storage section which stores object data corresponding to each part object of a model object formed by a plurality of part objects;

a slot state data storage section which stores a disposition state of the part object in a part slot provided corresponding to each of the part objects as slot state data;

a disposition direction reception section which receives a disposition direction for the part object;

a slot state update section which, when another part object has been disposed in the part slot corresponding to the part object for which the disposition direction has been issued, determines whether or not to update the slot state data of the part slot based on priority information which determines disposition priority of each of the part objects, and updates the slot state data based on a determination result; and an image generation section which acquires the object data from the object data storage section based on the updated slot state data, and generates an image of the model object based on the acquired object data.

According to a fifth aspect of the invention, there is provided an image generation system which generates an image, the image generation system comprising:

an object data storage section which stores object data corresponding to each part object of a model object formed by a plurality of part objects;

a slot state data storage section which stores a disposition state of the part object in a part slot provided corresponding to each of the part objects as slot state data;

a disposition direction reception section which receives a disposition direction for the part object using a part set including one or more of the part objects disposed in one or more of the part slots as a direction unit;

a slot state update section which updates the slot state data based on priority information which determines disposition priority of the part object included in the part set; and an image generation section which acquires the object data from the object data storage section based on the updated slot state data, and generates an image of the model object based on the acquired object data.

According to a sixth aspect of the invention, them is provided an image generation method comprising:

storing object data corresponding to each part object of a model object formed by a plurality of part objects in an object data storage section;

storing a disposition state of the part object in a part slot provided corresponding to each of the part objects in a slot state data storage section as slot state data;

receiving a disposition direction for the part object;

determining, when another part object has been disposed in the part slot corresponding to the part object for which the disposition direction has been issued, whether or not to update the slot state data of the part slot based on priority information which determines disposition priority of each of the part objects, and updating the slot state data based on a determination result; and acquiring the object data from the object data storage section based on the updated slot state data, and generating an image of the model object based on the acquired object data.

According to a seventh aspect of the invention, there is provided an image generation method comprising:

storing object data corresponding to each part object of a model object formed by a plurality of part objects in an object data storage section;

storing a disposition state of the part object in a part slot provided corresponding to each of the part objects in a slot state data storage section as slot state data;

receiving a disposition direction for the part object using a part set including one or more of the part objects disposed in one or more of the part slots as a direction unit;

updating the slot state data based on priority information which determines disposition priority of the part object included in the part set; and acquiring the object data from the object data storage section based on the updated slot state data, and generating an image of the model object based on the acquired object data.

BRIEF DESCRIPTION OF THE SEVERAL VIEWS OF THE DRAWING

FIG. 4 is a table illustrative of part set data.

FIG. 5 is a table illustrative of part set data.

FIGS. 6A to 6C are tables for describing a method of updating slot state data according to one embodiment of the invention.

DETAILED DESCRIPTION OF THE EMBODIMENTS

Figure 1:
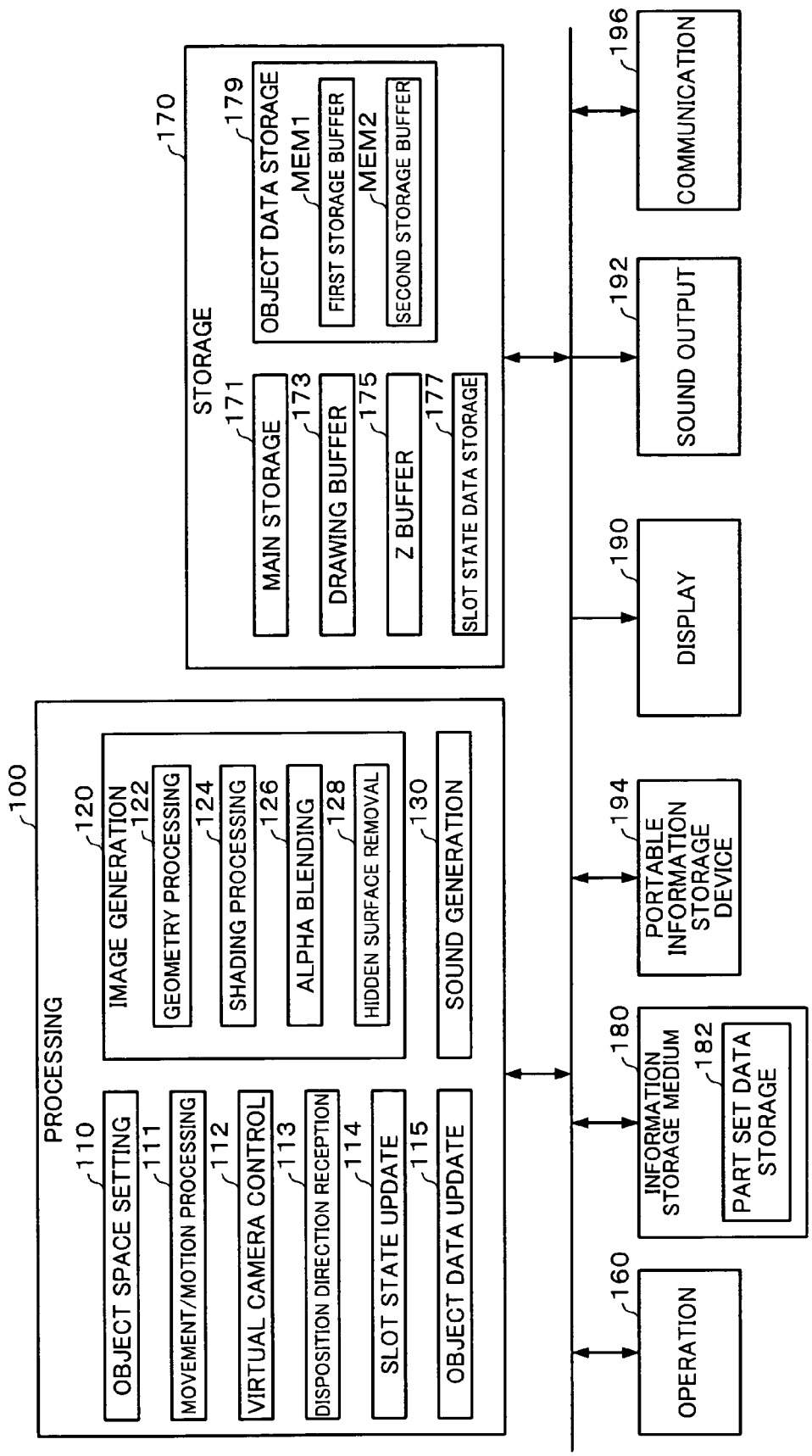
FIG. 1 is a functional block diagram of an image generation system according to one embodiment of the invention.

The invention may provide a program, an information storage medium, an image generation system, and an image generation method enabling a wide range of customization of a model object at a reduced processing load.

According to one embodiment of the invention, there is provided an image generation system which generates an image, the image generation system comprising:

an object data storage section which stores object data corresponding to each part object of a model object formed by a plurality of part objects;

a slot state data storage section which stores a disposition state of the part object in a part slot provided corresponding to each of the part objects as slot state data;

a disposition direction reception section which receives a disposition direction for the part object;

a slot state update section which, when another part object has been disposed in the part slot corresponding to the part object for which the disposition direction has been issued, determines whether or not to update the slot state data of the part slot based on priority information which determines disposition priority of each of the part objects, and updates the slot state data based on a determination result; and an image generation section which acquires the object data from the object data storage section based on the updated slot state data, and generates an image of the model object based on the acquired object data According to one embodiment of the invention, there is provided a program which causes a computer to function as the above-described sections.

According to one embodiment of the invention, there is provided a computer-readable information storage medium storing a program which causes a computer to function as the above-described sections.

The computer used herein refers to a physical device including a processor (processing section: CPU, GPU, or the like), a memory (storage section), an input device, and an output device as basic elements. This also applies to the following description.

The part slot corresponds to a container for disposing the part object. In other words, the part slot corresponds to a portion of the model object.

The disposition state of the part object indicates the presence or absence of the part object and the type of disposed part object. Specifically, the slot state data is data including part object disposition information indicating whether or not the part object is disposed in the part slot and, when the part object is disposed, indicating the type of part object disposed in the part slot unit.

According to the embodiments, when two or more part objects disposed in the part slot compete, an image of the model object in which two or more parts arm disposed so that the model object wears two or more suits of clothes in layers can be generated using the priority information. In this case, since the model object can be formed by only the minimum part objects according to the disposition priority relationship, a model object can be customized in various ways at a reduced processing load.

In each of the image generation system, the program and the information storage medium, when the part object for which the disposition direction has been issued is given disposition priority over the other part object which has been disposed in the part slot corresponding to the part object, the slot state update section may determine that the slot state data must be up and dispose the part object for which the disposition direction has been issued in the part slot in place of the other part object to update the slot state data.

This allows the part object with higher disposition priority to be disposed in place of the part object with lower disposition priority, whereby an image of the model object wearing two or more parts in layers can be generated using a minimum amount of data.

In each of the image generation system, the program and the information storage medium, when the part object for which the disposition direction has been issued is not given disposition priority over the other part object which has been disposed in the part slot corresponding to the part object, the slot state update section may determine that the slot state data must not be updated.

This enables the model object to be formed without disposing the part object which does not appear on the outer surface when disposing two or more part objects in layers, whereby the memory capacity can be saved.

In each of the image generation system, the program and the information storage medium, when the part object for which the disposition direction has been issued is given disposition priority equal to that of the other part object which has been disposed in the part slot corresponding to the part object, the slot state update section may determine that the slot state data must be updated, and dispose the part object for which the disposition direction has been issued in the part slot in place of the other part object to update the slot state data.

This allows the slot state data to be updated merely by disposing only the part object which appears on the outer surface excluding a portion hidden by the part object with higher disposition priority when changing the part objects with equal disposition priority, whereby the processing load can be reduced when updating the model object by changing the part object.

In each of the image generation system, the program and the information storage medium, one or more of the part objects disposed in one or more of the part slots may be provided as a part set;

the disposition priority of the part object included in the part set may be set in part set units; and the disposition direction reception section may receive the disposition direction for the part object using the part set as a direction unit.

This makes it possible to dispose the part objects in part set units instead of part slot units, whereby the user interface environment can be improved.

In each of the image generation system, the program and the information storage medium, when two or more of the part objects are included in the part set, the slot state update section may determine whether or not to update the slot state data in part slot units corresponding to each of the part objects included in the part set, and update the slot state data in part slot units.

This makes it possible to form the model object using a minimum amount of data, even if the disposition direction for the part object has been issued in part set units, by updating the slot state data in part slot units.

According to one embodiment of the invention, there is provided an image generation system which generates an image, the image generation system comprising:

an object data storage section which stores object data corresponding to each part object of a model object formed by a plurality of part objects;

a slot state data storage section which stores a disposition state of the part object in a part slot provided corresponding to each of the part objects as slot state data;

a disposition direction reception section which receives a disposition direction for the part object using a part set including one or more of the part objects disposed in one or more of the part slots as a direction unit;

a slot state update section which updates the slot state data based on priority information which determines disposition priority of the part object included in the part set; and an image generation section which acquires the object data from the object data storage section based on the updated slot state data, and generates an image of the model object based on the acquired object data.

According to one embodiment of the invention, there is provided a program which causes a computer to function as the above-described sections.

According to one embodiment of the invention, there is provided a computer-readable information storage medium storing a program which causes a computer to function as the above-described sections.

According to these embodiments, since the disposition direction for the part object can be issued in part set units instead of part slot units corresponding to the part object, the user interface environment can be improved in a system in which the model object is customized by changing the part object.

In each of the image generation system the program and the information storage medium, a lower-order position part slot in which a lower-order part object with lower disposition priority is disposed, and a higher-order position part slot in which a higher-order part object with higher disposition priority is disposed may be provided;

variation selection information for selecting a variation object of one or more of the lower-order part objects included in a lower-order part set may be set for a higher-order part set including one or more of the higher-order part objects; and when the variation selection information has been set for the higher-order part set for which the disposition direction has been issued, the slot state update section may determine that the slot state data must be updated, and dispose the variation object of the lower-order part object in the lower-order part slot based on the variation selection information set for the higher-order part set to update the slot state data.

This prevents a situation in which the image of the model object restructured by changing the part object in response to the disposition direction for the part object is adversely affected.

In each of the image generation system, the program and the information storage medium, a lower-order position part slot in which a lower-order part object with lower disposition priority is disposed, and a higher-order position part slot in which a higher-order part object with higher disposition priority is disposed may be provided;

variation selection information for selecting a variation object of the higher-order part object corresponding to one or more of the lower-order part objects included in a lower-order part set may be set for a higher-order part set including one or more of the higher-order part objects; and when the variation selection information has been set for the higher-order part set for which the disposition direction has been issued, the slot state update section may dispose the variation object of the higher-order part object selected corresponding to the lower-order part object disposed in the lower-order part slot in the higher-order part slot based on the variation selection information set for the higher-order part set to update the slot state data.

This ensures consistency between the lower-order part object and the high-order part object, whereby a situation can be prevented in which the image of the model object restructured by disposing the high-order part object is adversely affected.

In any of the above-described image generation systems, the object data storage section may include a first storage buffer and a second storage buffer, the image generation system may include an object data update section which updates the object data stored in the first and second storage buffers based on the slot state data; and in a period in which one of the first and second storage buffers is updated by the object data update section, the image generation section may output an image of the model object generated based on the object data stored in the other storage buffer to a display section.

Each of the program and the information storage medium may cause a computer to function as the above-described object data storage section, object data update section, and image generation section.

This effectively prevents a situation in which the model object cannot be restructured before updating the frame.

According to one embodiment of the invention, there is provided an image generation method comprising:

storing object data corresponding to each part object of a model object formed by a plurality of part objects in an object data storage section;

storing a disposition state of the part object in a part slot provided corresponding to each of the part objects in a slot state data storage section as slot state data;

receiving a disposition direction for the part object;

determining, when another part object has been disposed in the part slot corresponding to the part object for which the disposition direction has been issued, whether or not to update the slot state data of the part slot based on priority information which determines disposition priority of each of the part objects, and updating the slot state data based on a determination result; and acquiring the object data from the object data storage section based on the updated slot state data, and generating an image of the model object based on the acquired object data.

According to one embodiment of the invention, there is provided an image generation method comprising:

storing object data corresponding to each part object of a model object formed by a plurality of part objects in an object data storage section;

storing a disposition state of the part object in a part slot provided corresponding to each of the part objects in a slot state data storage section as slot state data;

receiving a disposition direction for the part object using a part set including one or more of the part objects disposed in one or more of the part slots as a direction unit;

updating the slot state data based on priority information which determines disposition priority of the part object included in the part set; and acquiring the object data from the object data storage section based on the updated slot state data, and generating an image of the model object based on the acquired object data.

These embodiments of the invention will be described below. Note that the embodiments described below do not in any way limit the scope of the invention laid out in the claims herein. In addition, not all of the elements of the embodiments described below should be taken as essential requirements of the invention.

1. Configuration

FIG. 1 shows an example of a functional block diagram of an image generation system (game system) according to one embodiment of the invention. The image generation system according to this embodiment may have a configuration in which some of the elements (sections) shown in FIG. 1 are omitted.

An operation section 160 allows a player to input operational data of a player's object (player's character operated by the player). The function of the operation section 160 may be realized by a lever, button, steering wheel, microphone, touch panel type display, casing, or the like. A storage section 170 functions as a work area for a processing section 100, a communication section 196, and the like. The function of the storage section 170 may be realized by a RAM (VRAM) or the like An information storage medium 180 (computer-readable medium) stores a program, data, and the like. The function of the information storage medium 180 may be realized by an optical disk (CD or DVD), magneto-optical disk (MO), magnetic disk, hard disk, magnetic tape, or memory (ROM). The processing section 100 performs various types of processing according to this embodiment based on a program (data) stored in the information storage medium 180. Specifically, a program for causing a computer to function as each section according to this embodiment (program for causing a computer to execute the processing of each section) is stored in the information storage medium 180.

A display section 190 outputs an image generated according to this embodiment. The function of the display section 190 may be realized by a CRT, LCD, touch panel type display, head mount display (HMD), or the like. A sound output section 192 outputs sound generated according to this embodiment. The function of the sound output section 192 may be realized by a speaker, headphone, or the like.

A portable information storage device 194 stores player's personal data, game save data, and the like. As the portable information storage device 194, a memory card, portable game device, and the like can be given. The communication section 196 performs various types of control for communicating with the outside (e.g. host device or another image generation system). The function of the communication section 196 may be realized by hardware such as a processor or communication ASIC, a program, or the like.

The program (data) for causing a computer to function as each section according to this embodiment may be distributed to the information storage medium 180 (storage section 170) from an information storage medium of a host device (server) through a network and the communication section 196. Use of the information storage medium of the host device (server) may also be included within the scope of the invention The processing section 100 (processor) performs processing such as game processing, image generation processing, or sound generation processing based on operational data from the operation section 160, a program, and the like. As the game processing, starting a game when game start conditions have been satisfied, proceeding with a game, disposing an object such as a character or a map, displaying an object, calculating game results, finishing a game when game end conditions have been satisfied, and the like can be given. The processing section 100 performs various types of processing using a main storage section 172 of the storage section 170 as a work area. The function of the processing section 100 may be realized by hardware such as a processor (e.g. CPU or DSP) or ASIC (e.g. gate array) and a program.

The processing section 100 includes an object space setting section 110, a movement/motion processing section 111, a virtual camera control section 112, a disposition direction reception section 113, a slot state update section 114, an object data update section 115, an image generation section 120, and a sound generation section 130. The processing section 100 may have a configuration in which some of these sections are omitted.

The object space setting section 110 disposes various objects (objects formed by a primitive such as a polygon, free-form surface, or subdivision surface) representing display objects such as a character, building, stadium, car, tree, pillar, wall, or map (topography) in an object space. Specifically, the object space setting section 110 determines the position and the rotational angle (synonymous with orientation or direction) of a model object in a world coordinate system, and disposes the object at the determined position (X, Y, Z) and the determined rotational angle (rotational angles around X, Y, and Z axes). Object data which defines the object is stored in an object data storage section 179.

The movement/motion processing section 111 calculates the movement/motion (movement/motion simulation) of the object (e.g. character, car, or airplane). Specifically, the movement/motion processing section 111 causes the object to move in the object space or to make a motion (animation) based on the operational data input by the player using the operation section 160, a program (movement/motion algorithm), various types of data (motion data), and the like. In more detail, the movement/motion processing section 111 performs simulation processing by sequentially calculating movement information (position, rotational angle, speed, or acceleration) and motion information (position or rotational angle of each part object) of the object in frame (1/60 sec) units. The frame is a time unit for performing the movement/motion processing (simulation processing) of the object and the image generation processing.

The virtual camera control section 112 controls a virtual camera (viewpoint) for generating an image viewed from a given (arbitrary) viewpoint in the object space. In more detail, the virtual camera control section 112 controls the position (X, Y, Z) or the rotational angle (rotational angles around X, Y, and Z axes) of the virtual camera (controls the viewpoint position or the line-of-sight direction).

For example, when imaging the object (e.g. character, ball, or car) from behind using the virtual camera, the virtual camera control section 112 controls the position or the rotational angle (orientation) of the virtual camera so that tie virtual camera follows a change in the position or the rotation of the object. In this case, the virtual camera control section 112 may control the virtual camera based on information such as the position, rotational angle, or speed of the object obtained by the movement/motion processing section 111. Or, the virtual camera control section 112 may rotate the virtual camera at a predetermined rotational angle or may move the virtual camera along a predetermined path. In this case, the virtual camera control section 112 controls the virtual camera based on virtual camera data for specifying the position (path) or the rotational angle of the virtual camera.

When two or more virtual cameras (viewpoints) exist, the above-described control is performed for each virtual camera.

The disposition direction reception section 113 receives a disposition direction for a part object for forming the model object in a part slot corresponding to the part object. In this embodiment, one or more part objects disposed in one or more part slots may be provided as a part set, and the disposition direction reception section 113 may receive the disposition direction for the part object using the part set as a direction unit. In more detail, when the player has selected one of the part sets displayed on a screen using the operation section 160, the disposition direction reception section 113 receives the disposition direction for the part object included in the selected part set.

When another part object has been disposed in the part slot corresponding to the part object for which the disposition direction has been issued, the slot state update section 114 determines whether or not to update the slot state data of the part slot based on priority information which determines the disposition priority of each part object, and updates the slot state data stored in a slot state data storage section 177 based on the determination result. Specifically, the slot state update section 114 disposes the part object in each part slot.

The slot state data is data for specifying the presence or absence of the part object and the type of disposed part object in part slot units. Specifically, the slot state data is information for managing the disposition of the part object. The slot state data is stored in the slot state data storage section 177 provided in the storage section 170. The slot state data storage section 177 may have a single buffer configuration or a double buffer configuration.

The priority information is information for disposing the part object with higher disposition priority (higher-order part object) in the part slot preferentially over the part object with lower disposition priority (lower-order part object). The priority information is set in part set units so that the part objects included in a single part set are given identical disposition priority.

The object data update section 115 updates the object data stored in the object data storage section 179 based on the slot state data. In this embodiment, the object data storage section 179 has a double buffer configuration including a first storage buffer and a second storage buffer, and the first storage buffer and the second storage buffer are updated alternately. In more detail, the object data update section 115 performs update processing by reading (loading) the object data of the part object which is disposed in the part slot of which the slot state data has been updated into the update target storage buffer, and copying the object data of the part object which has been disposed in the part slot of which the slot state data has not been updated into the update target storage buffer from the updated storage buffer.

The image generation section 120 performs drawing processing based on the results of various types of processing (game processing) performed by the processing section 100 to generate an image, and outputs the generated image to the display section 190. When generating a three-dimensional game image, geometric processing such as coordinate transformation (world coordinate transformation or camera coordinate transformation), clipping, or perspective transformation is performed, and drawing data e.g. position coordinates of primitive vertices, texture coordinates, color data, normal vector, or alpha value) is created based on the processing results. The object (one or more primitives) after perspective transformation (after geometry processing) is drawn in a drawing buffer 174 (buffer which can store image information in pixel units, such as frame buffer or intermediate buffer (work buffer); VRAM) based on the drawing data (object data). As a result, an image viewed from the virtual camera (given viewpoint) in the object space is generated. When two or more virtual cameras (viewpoints) exist, the drawing processing is performed so that images viewed from the virtual cameras can be displayed on one screen as divided images.

The image generation section 120 includes a geometry processing section 122, a shading processing section 124, an alpha blending section 126, and a hidden surface removal section 128.

The geometry processing section 122 performs geometry processing for the object. In more detail, the geometry processing section 122 performs geometry processing such as clipping, perspective transformation, or light source calculation. The object data (e.g. object's vertex position coordinates, texture coordinates, color data (luminance data), normal vector, or alpha value) after the geometry processing (after perspective transformation) is stored in the object data storage section 179 (first storage buffer MEM1 or second storage buffer MEM2).

The shading processing section 124 shades in the object. In more detail, the shading processing section 124 adjusts the luminance of the drawing pixel of the object based on the results (shade information) of the light source calculation performed by the geometry processing section 122. If necessary, the shading processing section 124 may perform the light source calculation without causing the geometry processing section 122 to perform the light source calculation. As the shading processing, flat shading or smooth shading such as Gouraud shading or Phong shading may be performed for the object.

The alpha blending section 126 performs translucent blending (e.g. normal alpha blending, additive alpha blending, or subtractive alpha blending) based on the alpha value (A value) In normal alpha blending, the alpha blending section 126 performs processing shown by the following expressions (1) to (3).

$$R_Q = (1-\alpha) \times R_1 + \alpha \times R_2 \quad (1)$$

$$G_Q = (1-\alpha) \times G_1 + \alpha \times G_2 \quad (2)$$

$$B_Q = (1-\alpha) \times B_1 + \alpha \times B_2 \quad (3)$$

In additive alpha blending, the alpha blending section 126 performs processing shown by the following expressions (4) to (6).

$$R_Q = R_1 + \alpha \times R_2 \quad (4)$$

$$G_Q = G_1 + \alpha \times G_2 \quad (5)$$

$$B_Q = B_1 + \alpha \times B_2 \quad (6)$$

In subtractive alpha blending, the alpha blending section 126 performs processing shown by the following expressions (7) to (9).

$$R_Q = R_1 - \alpha \times R_2 \quad (7)$$

$$G_Q = G_1 - \alpha \times G_2 \quad (8)$$

$$B_Q = B_1 - \alpha \times B_2 \quad (9)$$

$R_1$, $G_1$, and $B_1$ are RGB components of the image (original image) which has been drawn in the drawing buffer 174, and $R_2$, $G_2$, and $B_2$ are RGB components of the image to be drawn in the drawing buffer 174. $R_Q$, $G_Q$, and $B_Q$ are RGB components of the image obtained by alpha blending. The alpha value is information which can be stored while being associated with each pixel (texel or dot), such as additional information other than the color information. The alpha value may be used as mask information, translucency (equivalent to transparency or opacity), bump information, or the like.

The hidden surface removal section 128 performs hidden surface removal by a Z buffer method (depth comparison method or Z test) using a Z buffer 175 (depth buffer) which stores the Z value (depth information) of the drawing pixel. Specifically, the hidden surface removal section 128 refers to the Z value stored in the Z buffer 175 when drawing the drawing pixel corresponding to the primitive of the object. The hidden surface removal section 128 compares the Z value in the Z buffer 175 with the Z value of the drawing pixel of the primitive. When the Z value of the drawing pixel is the Z value in front of the virtual camera (e.g. small Z value), the hidden surface removal section 128 draws the drawing pixel and updates the Z value in the Z buffer 175 with a new Z value.

The sound generation section 130 performs sound processing based on the results of various types of processing performed by the processing section 100 to generate game sound such as background music (BGM), effect sound, or voice, and outputs the generated game sound to the sound output section 192.

The image generation system according to this embodiment may be a system dedicated to a single-player mode in which only one player can play a game, or may be a system provided with a multi-player mode in which two or more players can play a game. When two or more players play a game, game images and game sound provided to the players may be generated using one terminal, or may be generated by distributed processing using two or more terminals (game devices or portable telephones) connected through a network (transmission line or communication line), for example.

2. Method According to This Embodiment

A method according to this embodiment is described below with reference to the drawings The method according to this embodiment may be applied to represent various models in addition to a model described below.

2.1 Description of Part Slot

In this embodiment, the part slot is provided corresponding to each part object of the model object formed by a plurality of part objects, and the part object is disposed in part slot units.

The part slot means a part object disposition space set in a model coordinate system, and corresponds to the constituent portion of the model object. In this embodiment, human body part slots A1 to A14 (first part slots in a broad sense) shown in FIG. 2 corresponding to the constituent portions of the human body, and ornamental part slots B1 to B10 (second part slots in a broad sense) shown in FIG. 3 corresponding to the constituent portions of an ornament attached to the human body are provided.

Figure 2:
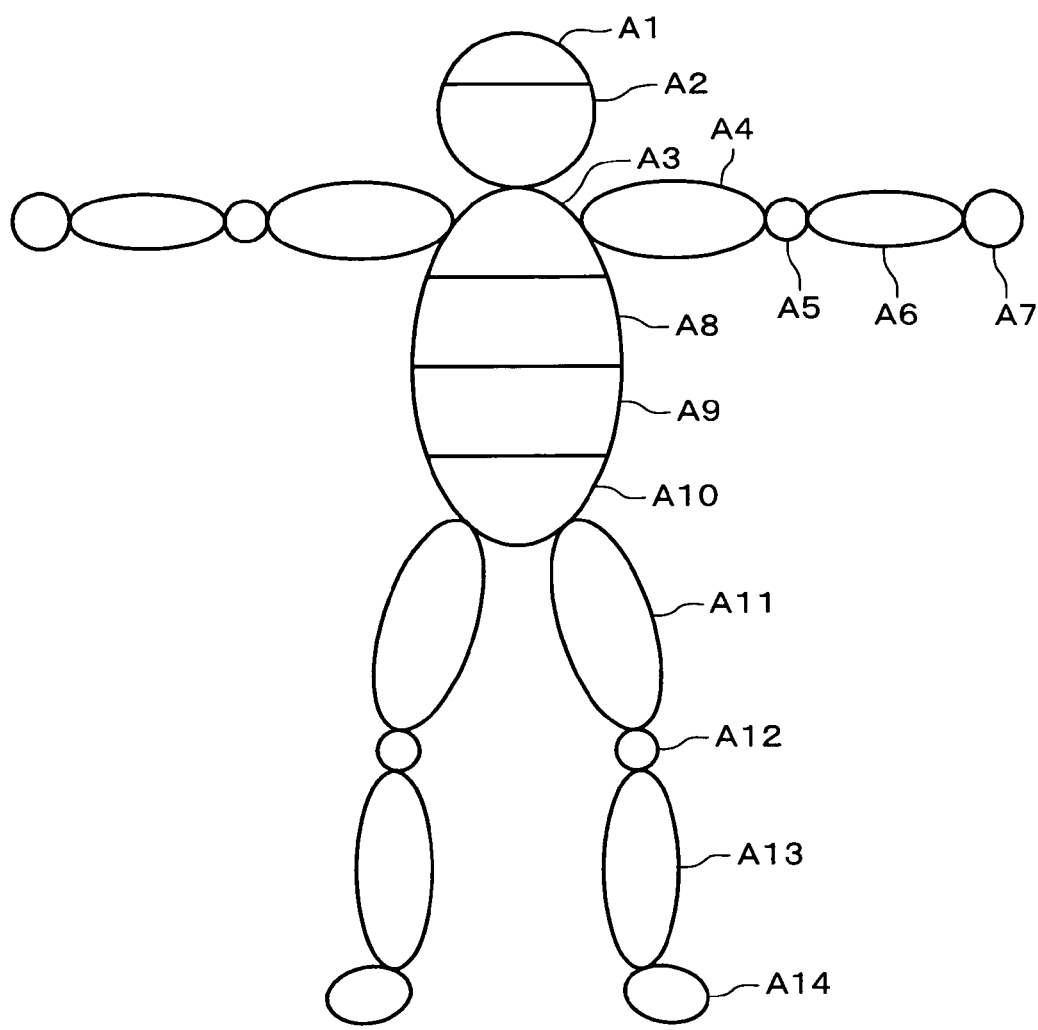
FIG. 2 is a diagram illustrative of a part slot.

In FIG. 2, fourteen human body part slots A1 to A14 correspond to the constituent portions of the human body. For example, the arm is made up of four human body part slots A4 to A7. The human body part slot A4 corresponds to the upper arm, the human body part slot A5 corresponds to the elbow, the body part slot A6 corresponds to the forearm, and the human body part slot A7 corresponds to the hand, for example. Not only the part object corresponding to the constituent portion of the human body, but also the part object such as a shirt or a jacket may be disposed in the human body part slots A1 to A14. For example, parts of a short sleeve T-shirt may be formed using the human body part slots A3, A4, A8, and A9, and parts of a long sleeve T-shirt may be formed using the human body part slots A3 to A6, A8, and A9.

Figure 3:
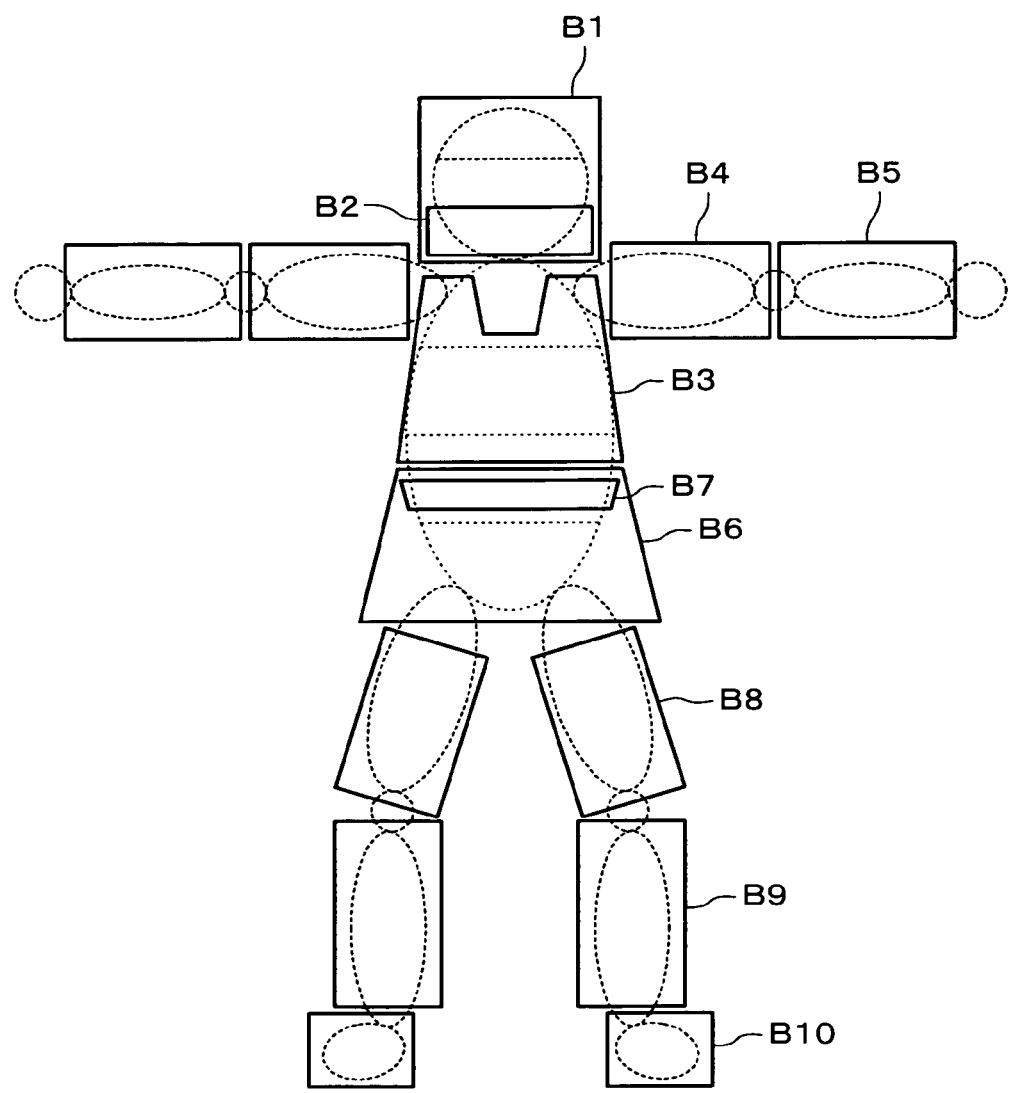
FIG. 3 is a diagram illustrative of a part slot.

In FIG. 3, the ornamental part slots B1 to B10 in which the part objects are disposed to overlap one or more human body part slots are provided, for example. The ornamental part slots B1 to B10 are used when it is necessary to dispose two or more parts in layers, such as when dressing the model object in two or more suits of clothes one over the other. In other words, the ornamental part slots B1 to B10 may be called overlapping part slots. For example, the ornamental part slot B2 is used when disposing a beard on the face. Full armor may be created using the ornamental part slots B1, B3 to B6, and B8 to B10. The part objects given disposition priority over the part objects disposed in the human body part slots A1 to A14 are basically disposed in the ornamental part slots B1 to B10. The part object given disposition priority over the part object disposed in another ornamental part slot may be disposed in the ornamental part slot. For example, the ornamental part slot B7 is used when the model object wears a belt over a uniform or wears a belted skirt. The part object given disposition priority over the part object disposed in the ornamental part slot B8 is disposed in the ornamental part slot B7.

According to this embodiment, an image of the model object wearing two or more parts in layers can be generated by providing the human body part slots A1 to A14 and the ornamental part slots B1 to B10 and disposing the part object in each part slot to form a model object. Moreover, representation in which the joint is seen in the opening in a suit of armor or representation in which underwear is seen under open-necked clothes can be achieved by superposing the part objects disposed in the ornamental part slots B1 to B10 on the part objects disposed in the human body part slots A1 to A14, for example.

2.2 Description of Part Set

In this embodiment, one or mom part objects disposed in one or more human body part slots or ornamental part slots are provided as the part set. The disposition priority of the part object included in the part set is set in part set units, and the disposition direction for the part object is received using the part set as the direction unit.

FIG. 4 shows a data table of the human body part set data in which the part objects disposed in the human body part slots A1 to A14 shown in FIG. 2 are managed in part slot units, for example. In this embodiment, part sets ("hair 1", "hair 2", . . . ) for determining the hairstyle of the model object are provided for the human body part slot A1, part sets ("face 1", "face 2", . . . ) for determining the face of the model object are provided for the human body part slot A2, and part sets ("human body 1", "human body 2", . . . ) for determining the body of the model object are provided for the human body part slots A3 to A14. In this data table, the relationship between the part object included in each part set and the human body part slot, the priority information indicating the disposition priority of the part object included in each part set, the object data and variation object data of the part object included in each part set, and the like are included in the part set data in part set units.

Since the disposition priority is set in part set units, the priority information indicating identical disposition priority is set for the part objects included in a single part set. The priority information is used when updating the slot state data which determines the part objects disposed in the human body part slots A1 to A14 or the ornamental part slots B1 to B10. The variation object data is set corresponding to the relationship with the part objects with higher disposition priority disposed in the ornamental part slots B1 to B10, and is not necessarily set for each human body part set. For example, when dressing the human body model in tight clothing and disposing clothing part objects which sufficiently represent the tightening effect in the ornamental part slots B1 to B10, the part objects having a more compact figure than the human body part set normally disposed are disposed as the variation objects. This prevents a situation in which part of the human body part object protrudes from the clothing part object.

FIG. 5 shows a data table of the ornamental part set data in which the part objects disposed in the human body part slots A1 to A14 shown in FIG. 2 or the ornamental part slots B1 to B10 shown in FIG. 3 are managed in part slot units. The ornamental part set data includes, in part set units, the relationship between the part set and the part slot, the priority information indicating the disposition priority of the part object included in the part set, the object data and variation object data of the part object included in the part set, variation selection information necessary for selecting the variation object when the part set with lower disposition priority has been disposed, monitor slot information for selecting the variation object corresponding to the part set with lower disposition priority, disposition clear information for clearing the part object disposed in the part slot corresponding to the part object included in the part set with lower disposition priority when disposing the part set with higher disposition priority, and the like.

The variation selection information is information for changing the disposition of the part object by selecting the variation object of the part object disposed in the human body part slots A1 to A14 when the part set including the part object disposed in the ornamental part slots B1 to B10 has been selected. The ornamental part slots B1 to B10 may include a slot in which the part object with higher disposition priority is disposed and a slot in which the part object with lower disposition priority is disposed. In this case, the variation object may also be selected.

The monitor slot information is information for disposing the variation object so that consistency in shape is achieved by monitoring the type of part object disposed in the part slot (e.g. human body part slot A2) in which the part object with lower disposition priority is disposed. When the part set for which the monitor slot information has been set is selected, the part object in a default pattern (e.g. WOB-B2) or the variation object (e.g. WOB-B2$a$ or WOB-B2$b$) to be disposed is selected using the variation selection information corresponding to the type of part object (e.g. "face 1" (FOB1-A2) or "face 2" (FOB2-A2)) disposed in the part slot (e.g. human body part slot A2) set as the monitoring slot.

The disposition clear information is information for specifying the part slot in which the part object is hidden behind the part object disposed in the ornamental part slot and need not be disposed when the part objects are disposed in the human body part slot (e.g. human body part slot A8) and the ornamental part slot (e.g. ornamental part slot B3) to overlap. When updating the slot state data, the part object is not disposed in the set part slot for which the disposition clear information has been set, or the part object which has been disposed is cleared based on the disposition clear information.

The part set data is stored in a part set data storage section 182 of the information storage medium 180. The object data is read from the part set data storage section 182 into the object data storage section 179. If necessary, a piece of the part set data may be expanded in a main storage section 171 of the storage section 170 in advance. For example, the part set data which must be frequently read may be expanded in the main storage section 171 in advance. For example, when the human body part set data is frequently read, the part set data may be expanded in the main storage section 171 in advance as resident data. This reduces the number of accesses to the information storage medium 180, whereby the processing time required to restructure the model object when changing the part object can be reduced.

2.3 Method of Updating Slot State Data

In this embodiment, the part object which forms the model object is disposed by updating a slot state data table. The slot state data table is formed by making a table of disposition of the part object with respect to the part slot.

When another part object is not disposed in the part slot corresponding to the part object for which the disposition direction has been issued, it is determined that the slot state data of the part slot must be updated, and the part object for which the disposition direction has been issued is disposed in the part slot to update the slot state data.

When another part object has been disposed in the part slot corresponding to the part object for which the disposition direction has been issued, the disposition priority of each part object determined based on the priority information is compared in part slot units to update the slot state data. When two or more part objects are included in the part set, whether or not to update the slot state data is determined in part slot units corresponding to each part object included in the part set to update the slot state data in part slot units. This minimizes the amount of object data which forms the model object.

In more detail, the slot state data may be updated as described in (A) to (C) given below.

(A) When the part object for which the disposition direction has been issued is given disposition priority over another part object which has been disposed in the part slot corresponding to the part object, it is determined that the slot state data must be updated, and the part object for which the disposition direction has been issued is disposed in the part slot in place of the other part object to update the slot state data.

(B) When the part object for which the disposition direction has been issued is not given disposition priority over another part object which has been disposed in the part slot corresponding to the part object, it is determined that the slot state data must not be updated. In this case, the other part object is continuously disposed without updating the slot state data of the part slot.

(C) When the part object for which the disposition direction has been issued is given disposition priority equal to that of another part object which has been disposed in the part slot corresponding to the part object, it is determined that the slot state data must be updated, and the part object for which the disposition direction has been issued is disposed in the part slot in place of the other part object to update the slot state data.

The method of updating the slot state data is described in detail with reference to FIGS. 6A to 6C.

In FIG. 6A, the part objects corresponding to the part sets of "hair 1" (HOB1-A1), "face 1" (FOB1-A2), and "human body 1" (NOB1-A3 to NOB1-A14) are disposed in the human body part slots A1 to A14, whereby a naked model object is formed. When dressing the naked model object in "T-shirt 1" (JOB1-A3/JOB1-A4/JOB1-A8/JOB1-A9), the part objects are disposed in slot units based on the disposition priority set for each part set.

"T-shirt 1" includes the pat objects (JOB1-A3/JOB1-A4/JOB1-A8/JOB1-A9) which are disposed in the human body part slots A3, A4, A8, and A9. Since the part objects included in the part set of "T-shirt 1" are given disposition priority over the pan objects (NOB1-A3/NOB1-A4/NOB1-A8/NOB1-A9) of the part set of "human body 1" disposed in the human body part slots A3, A4, A8, and A9, it is determined that the slot state data must be updated. Then, the part object (JOB1-A3/JOB1-A4/JOB1-A8/JOB1-A9) included in "T-shirt 1" are disposed in the human body part slots A3, A4, A8, and A9, as shown in FIG. 6B. Since it is unnecessary to update the slot state data of the remaining part slots, the part objects are continuously disposed in the remaining part slots as shown in FIG. 6A.

The case of dressing the model object wearing "T-shirt 1" shown in FIG. 6B in "uniform" is described below. In this case, the slot state data of the human body part slots A4 to A6 and the ornamental part slots B3 and B6 corresponding to the part objects (JOB4-A4/JOB4-A5/JOB4-A6/JOB4-B3/JOB4-B6) included in the part set of "uniform" is updated. The part object (JOB1-A4) included in the part set of "T-shirt 1" has been disposed in the human body part slot A4. However, since the part set of "uniform" is given disposition priority Over the part set of "T-shirt 1", the part object (JOB4-A4) included in the part set of "uniform" is disposed, as shown in FIG. 6C, to update the slot state data Likewise, the part objects (JOB4-A5/JOB4-A6) included in the part set of "uniform" are disposed in the human body part slots A5 and A6, in which the part objects (NOB1-A5/NOB1-A6) included in the part set of "human body 1" have been disposed, based on the disposition priority relationship. The disposition clear information, which indicates that the part objects disposed in the human body part slots A8 to A10 must be cleared, has been set for the part set of "uniform". Therefore, the part objects disposed in the human body part slots A8 to A10 are cleared, as shown in FIG. 6C, based on the disposition clear information. In FIG. 6B, the part objects are not disposed in the ornamental part slots B3 and B6 (NULL). Therefore, the slot state data is updated so that the part objects (JOB4-B3/JOB4-B6) included in the part set of "uniform" for which the disposition direction has been issued are disposed in the ornamental part slots B3 and B6, as shown in FIG. 6C.

According to the method of updating the slot state data of this embodiment, since the model object can be formed by only the minimum part objects according to the disposition priority relationship, the model object can be customized in various ways at a reduced processing load.

When the variation selection information has been set for the part set, the type of part object disposed in the part slot may be changed by selecting the variation object of the part object based on the variation selection information. Specifically, when the disposition direction for the part object with higher disposition priority has been issued, the variation object of the part object with higher disposition priority or lower disposition priority having a partially or completely different shape may be disposed corresponding to the combination of the part object with higher disposition priority and the part object with lower disposition priority.

For example, when the disposition direction has been issued for the part set including the part object with higher disposition priority and the variation selection information has been set for the part set, it is determined that the slot state data of the past slot in which the part object which is not given disposition priority over the part object included in that part set is disposed must be updated. Then, the variation object of the part object is disposed in the part slot in which the part object with lower disposition priority has been disposed based on the variation selection information set for the part set including the part object with higher disposition priority to update the slot state data.

When the disposition direction has been issued for the part set including the part object with higher disposition priority and the variation selection information has been set for the part set, the variation object of the part object with higher disposition priority selected corresponding to the part object, which has been disposed in the part slot in which the part object which is not given disposition priority over the part object included in the part set for which the disposition direction has been issued, may be disposed in the part slot corresponding to the variation object based on the variation selection information set for the part set to update the slot state data.

When two or more part objects compete in a single part slot, the slot state data may be updated so that the disposition priority of each part object is compared and the part object with higher disposition priority is disposed. The slot state data may be updated by sequentially disposing the part objects according to the disposition priority. For example, when sequentially disposing the part objects in the order from the part set including the part object with lower disposition priority, even if the part object with lower disposition priority has been disposed in the part slot, the slot state data may be updated by disposing the part object with higher disposition priority. When sequentially disposing the part objects in the order from the part set including the part object with higher disposition priority, the part object may be disposed only in the part slot in which another part object has not been disposed. When the part object with higher disposition priority has been disposed when disposing the part set including the part object with lower disposition priority, the part object with lower disposition priority may be disposed only in the part slot in which another part object has not been disposed without updating the slot state data of the part slot in which the part object with higher disposition priority has been disposed to update the slot state data, for example.

2.4 Method of Updating Object Data

In this embodiment, the memory (object data storage section 179) which stores the object data for forming the model object has a double buffer configuration including the first storage buffer MEM1 and the second storage buffer MEM2, and the object data stored in the fist storage buffer MEM1 and the second storage buffer MEM2 is alternately updated based on the slot state data.

In this embodiment, in a period in which one of the first and second storage buffers MEM1 and MEM2 is updated, an image of the model object generated based on the object data stored in the other storage buffer is output to the display section.

Figure 7A:
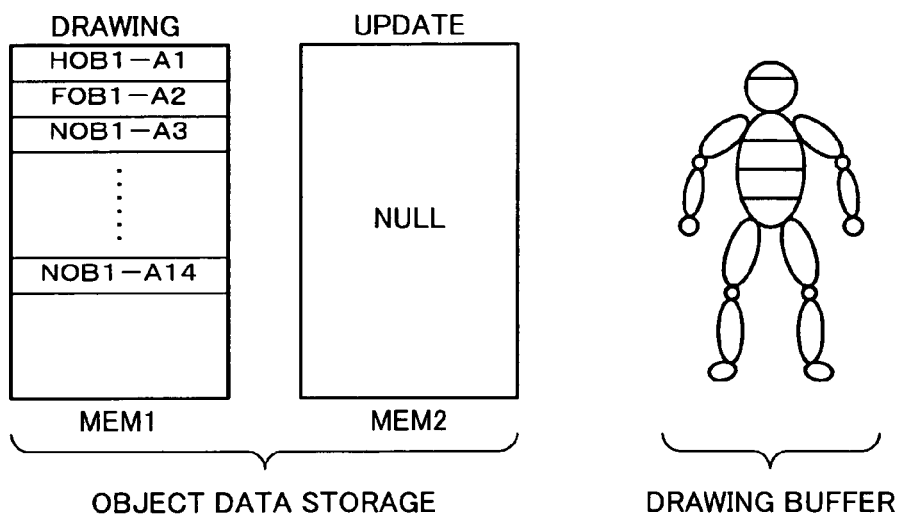
FIGS. 7A to 7C are diagrams for describing a method of updating object data according to one embodiment of the invention.
Figure 7B:
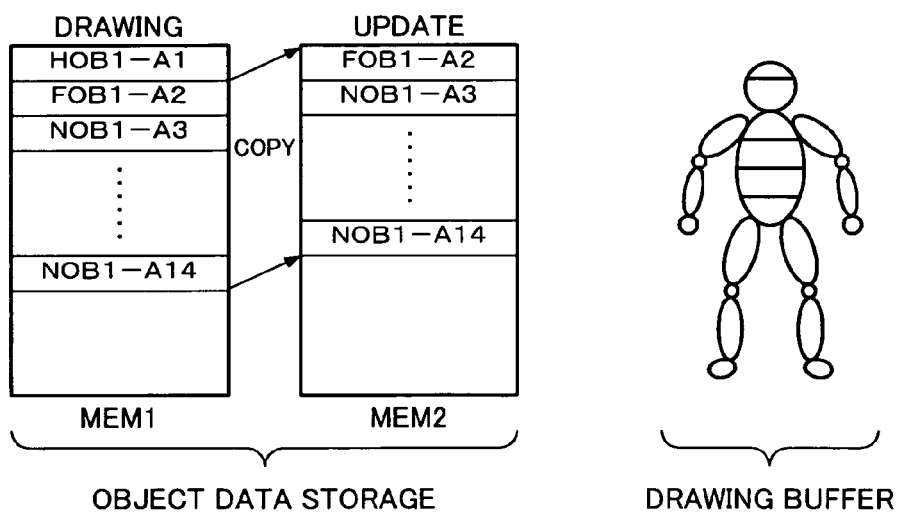
Figure 7C:
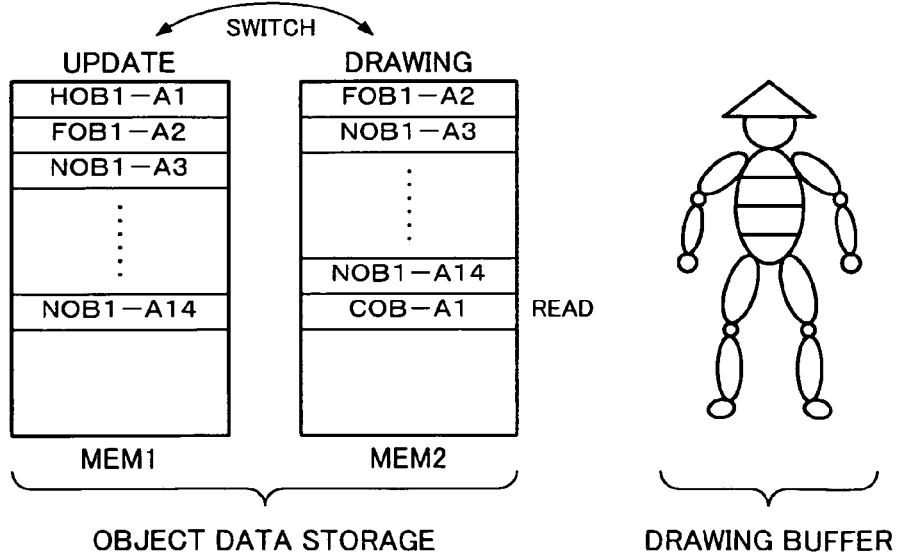

In more detail, as shown in FIG. 7A, one of the first and second storage buffers MEM1 and MEM2 is assigned to an update buffer, and the other storage buffer is assigned to a drawing buffer. The update buffer and the drawing buffer are alternately switched. As shown in FIG. 7B, when updating the object data, the object data of the part objects of which the disposition is maintained (FOB1-A2 and NOB1-A3 to NOB1-A14) is copied from the drawing buffer into the update buffer based on the updated slot state data This reduces the time required for updating the object data. As shown in FIG. 7B, an image of the model object is generated based on the unupdated object data (HOB1-A1, FOB1-A2, and NOB1-A3 to NOB1-A14) without switching the update buffer and the drawing buffer until the object data update processing in the update buffer is completed, and the generated image is output to the display section. After the object data update processing in the update buffer has been completed by reading the object data of the part object which must be additionally read based on the slot state data, the update buffer is switched to the drawing buffer, as shown in FIG. 7C, and an image of the model object is generated based on the updated object data (FOB-A2, NOB1-A3 to NOB1-A14, and COB-A1) and output to the display section. This prevents a situation in which the model object cannot be restructured before updating the frame and some of the part objects cannot be displayed, even when processing a large amount of pat object data.

2.5 Example of Changing Part Object using Method According to this Embodiment

Figure 8A:
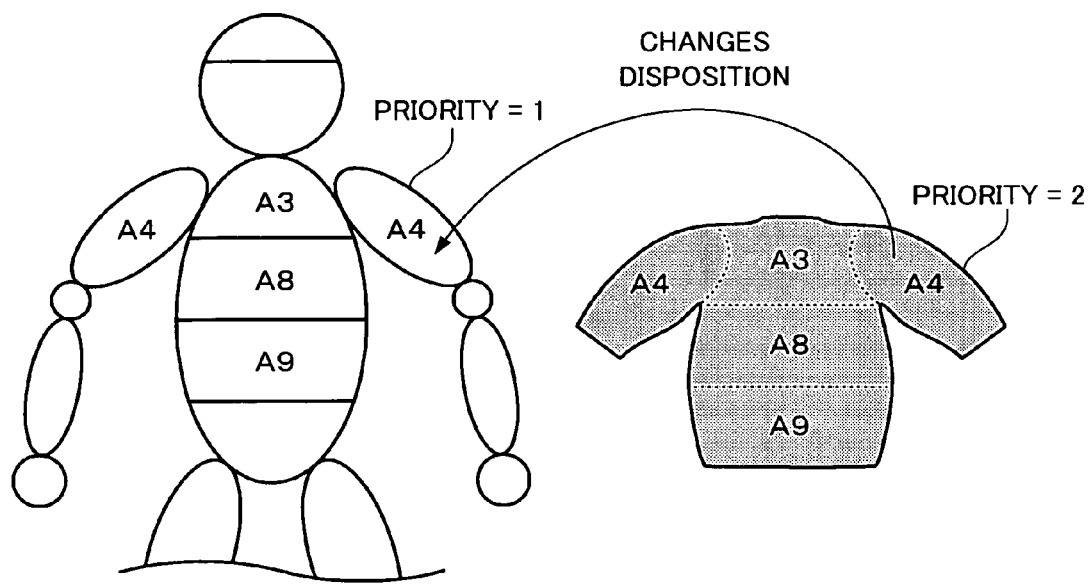
FIGS. 8A and 8B illustrate an example of changing a part object using a method according to one embodiment of the invention.
Figure 8B:
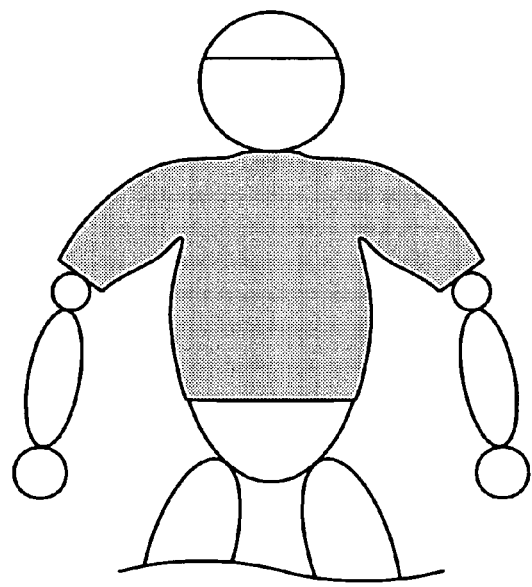

An example shown in FIGS. 8A and 8B illustrates the case of dressing a naked human body model in a T-shirt. Suppose that the naked human body model is formed by the part objects (HOB1-A1, FOB1-A2, NOB1-A3 to NOB1-A14) included in the human body part sets of "hair 1" (A1), "face 1" (A2), and "human body 1" (A3 to A14) shown in FIG. 4. Note that each case given below is described on the assumption that the naked human body model is formed using these human body part sets.

In FIG. 8A, the disposition direction has been issued for the part objects (JOB1-A3/JOB1-A4/JOB1-A8/JOB1-A9) included in the part set of "T-shirt 1" shown in FIG. 5 on the human body model. When updating the slot state data, whether or not to update the slot state data (i.e. whether or not to change the disposition of the part object) is determined in part slot units. In this case, whether or not to change the disposition of the part object is determined in part slot units based on the disposition priority of the part object set in part set units. For example, since the disposition direction for the part object (JOB1-A4) with higher disposition priority in the human body part slot A4 has been issued, the disposition of the part object is changed. Likewise, whether or not to change the disposition of the part object is determined for all the part slots, and the slot state data of the human body part slots A3, A4, A8, and A9, for which it has been determined to change the disposition of the part object, is updated to dispose the part objects (JOB1-A3/JOB1-A4/JOB1-A8/JOB1-A9) included in the part set of "T-shirt 1". As a result, a model object in which the human body model is dressed in "T-shirt 1" can be restructured using a small amount of data, as shown in FIG. 8.

Figure 9A:
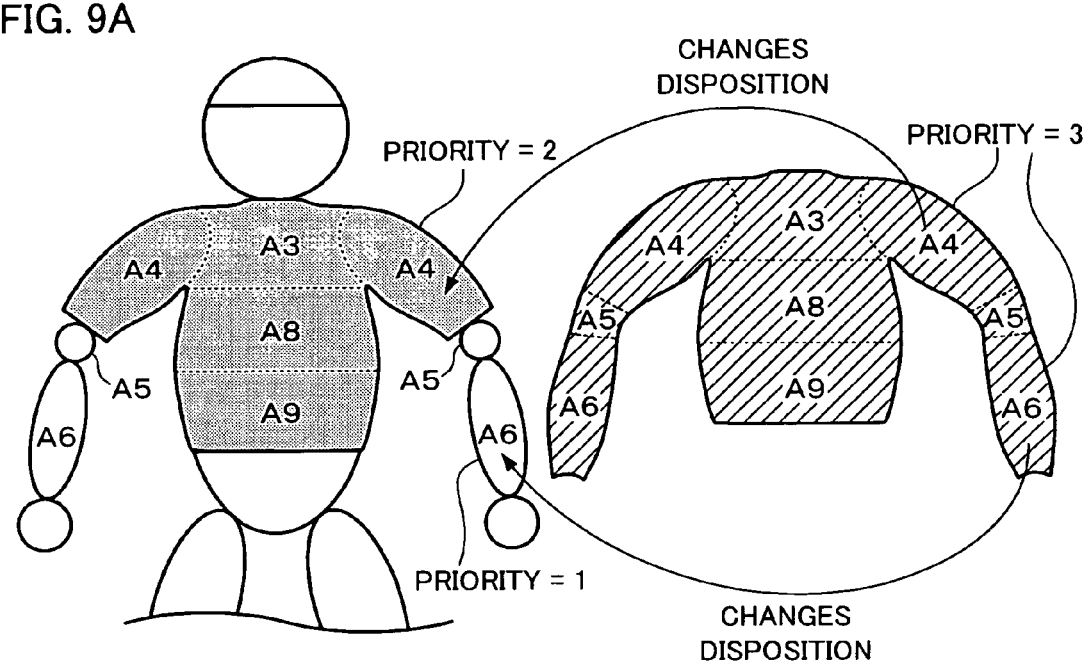
FIGS. 9A and 9B illustrate an example of changing a part object using a method according to one embodiment of the invention.
Figure 9B:
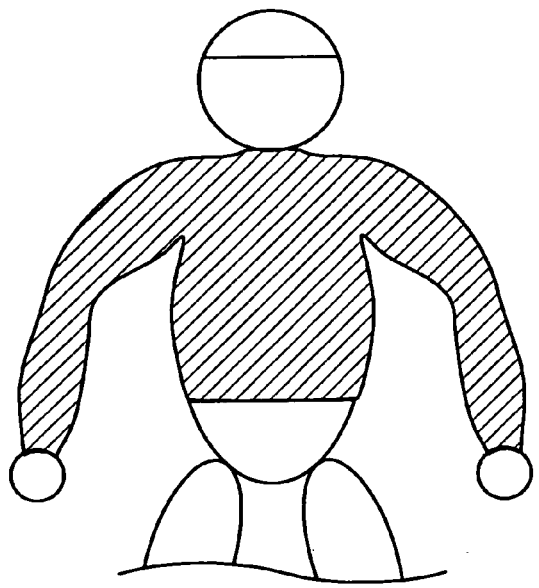

Consider the case of dressing the model object wearing "T-shirt 1" in "sweat suit" as shown in FIG. 9A In this case, whether or not to change the disposition of the part object is determined for all the part slots based on the disposition priority of the part object which has been disposed in each part slot and the disposition priority of each part object (JOB3-A3/JOB3-A4/JOB3-A5/JOB3-A6/JOB3-A8/JOB3-A9) included in the part set of "sweat suit". In the example shown in FIG. 9A, it is determined that the disposition of the part object must be changed for the human body part slots A3 to A6, A8, and A9, and the part objects (JOB3-A3/JOB3-A4/JOB3-A5/JOB3-A6/JOB3-A8/JOB3-A9) included in the part set of "sweat suit" are disposed in the human body part slots A3 to A6, A8, and A9 to update the slot state data. Then, the object data corresponding to the part objects of the model object is updated based on the updated slot state data, whereby the model object dressed in "sweat suit", as shown in FIG. 9B, can be restructured using a small amount of data.

Figure 10A:
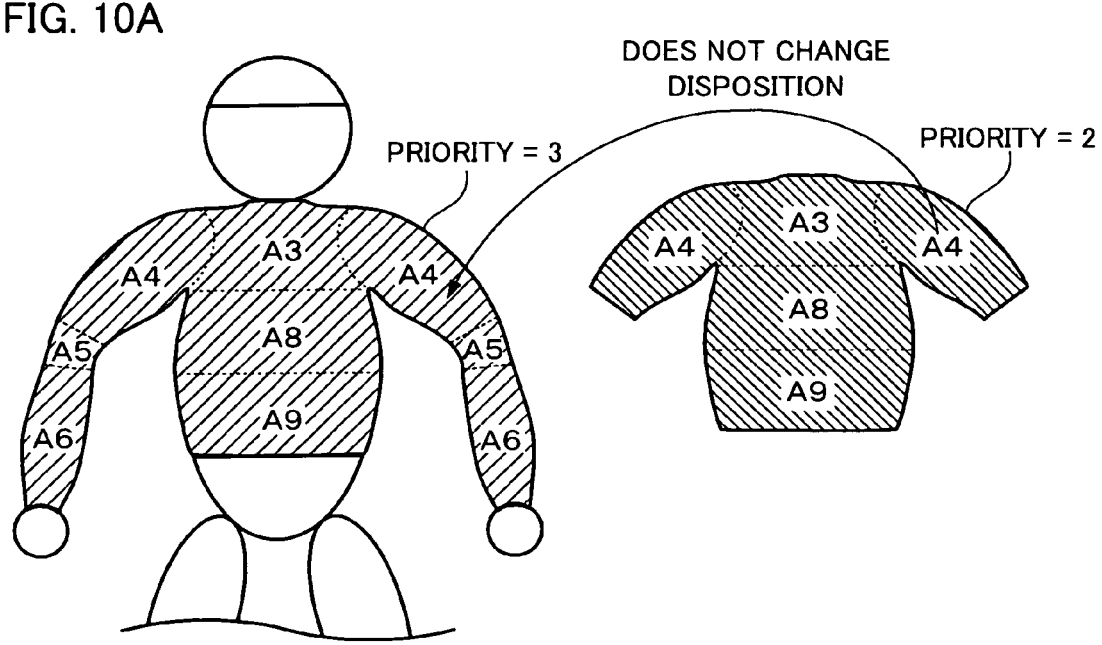
FIGS. 10A and 10B illustrate an example of changing a part object using a method according to one embodiment of the invention.
Figure 10B:
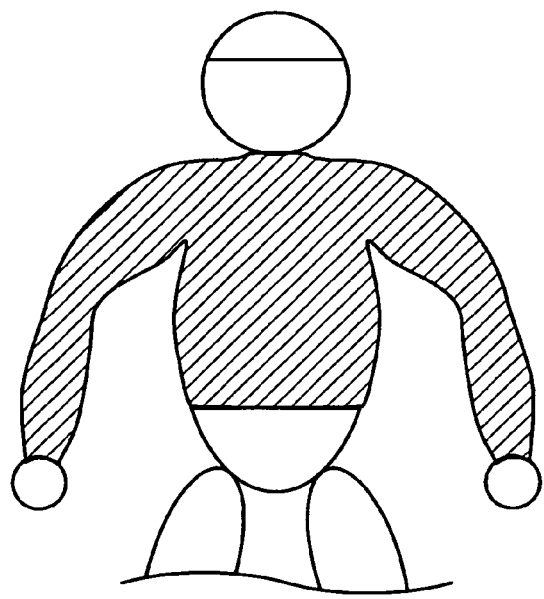

An example shown in FIGS. 10A and 10B illustrates the case of replacing the part set of "T-shirt 1" of the model object dressed in "sweat suit" with the part set of "T-shirt 2". In the human body part slots A3, A4, A8, and A9 corresponding to the part objects (JOB2-A3/JOB2-A4/JOB2-A8/JOB2-A9) included in the part set of "T-shirt 2", since the part objects (JOB2-A3/JOB2-A4/JOB2-A8/JOB2-A9) included in the part set of "T-shirt 2" are not given disposition priority over the part objects (JOB3-A3/JOB3-A4/JOB3-A5/JOB3-A6/JOB3-A8/JOB3-A9) included in the part set of "sweat suit", the part objects disposed in the human body part slots A3, A4, A8, and A9 are not changed. Specifically, the disposition of the part objects included in the part set of "sweat suit" which have been disposed is maintained, whereby the model object dressed in "sweat suit" is formed, as shown in FIG. 10B.

Figure 11A:
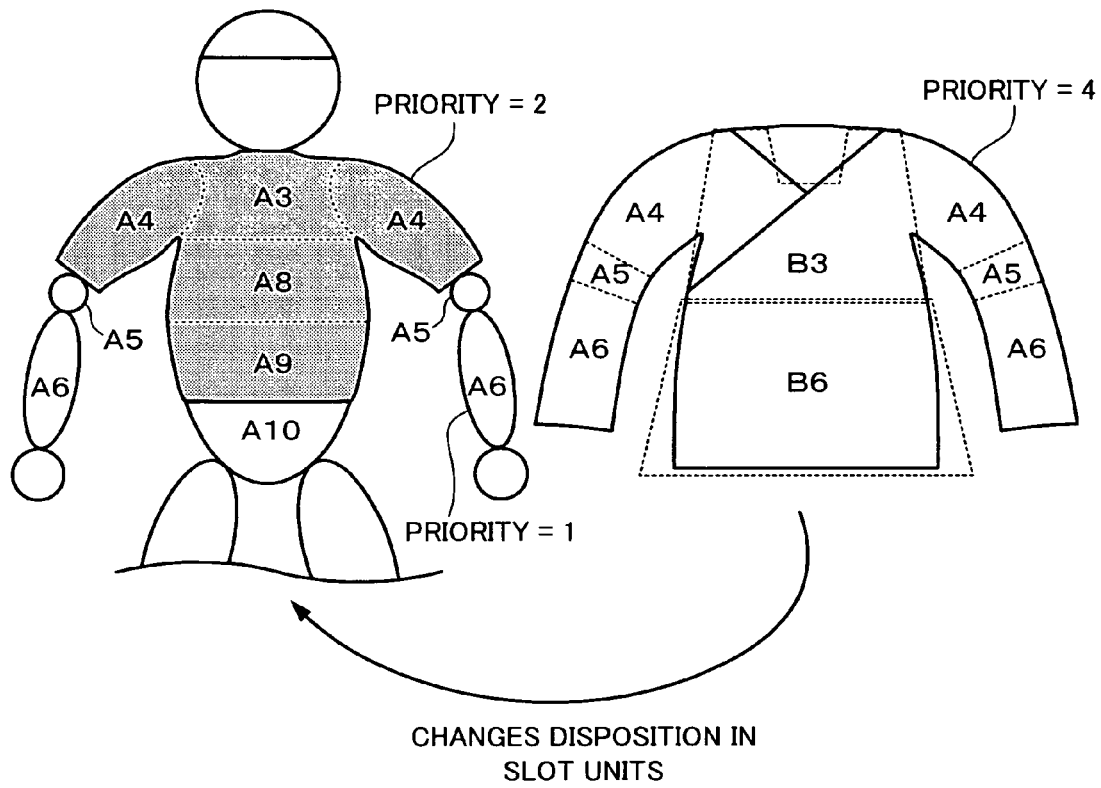
FIGS. 11A and 11B illustrate an example of changing a part object using a method according to one embodiment of the invention.
Figure 11B:
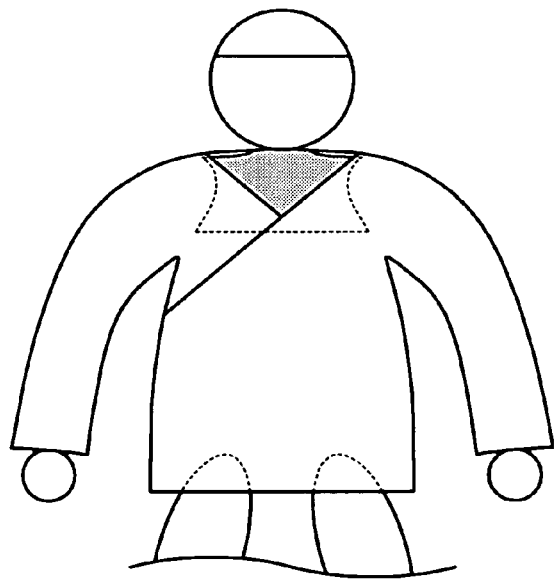

An example shown in FIGS. 11A and 11B illustrates the case of dressing the model object wearing "T-shirt" in "uniform". In this case, whether or not to change the disposition of the part object is also determined for all the part slots based on the disposition priority of the part object which has been disposed in each part slot and the disposition priority of each part object (JOB4-A4/JOB4-A5/JOB4-A6/JOB4-B3/JOB4-B6) included in the part set of "uniform" for which the disposition direction has been issued. Note that the disposition clear information which clears (cancels) the part objects disposed in the human body part slots A8, A9, and A10 has been set for the part set of "uniform", as shown in FIG. 5. The part objects (JOB4-B3 and JOB4-B6) disposed in the ornamental part slots B3 and B6 are included in the part set of "uniform", and these part objects are disposed to overlap the part objects (JOB1-A8, JOB1-A9, and NOB1-A10) disposed in the human body part slots A8 to A10. Specifically, some of the part objects do not appear on the outer surface. Therefore, since the image of the model object is not affected even if the part objects (JOB1-A8, JOB1-A9, and NOB1-A10) are not disposed in the human body part slots A8 to A10, the amount of object data for forming the model object can be reduced by clearing the part objects disposed in the human body part slots A8 to A10. On the other hand, since the part object (JOB1-A3) disposed in the human body part slot A3 should be seen in the opening in the part object (JOB4-B3) included in the part set of "uniform" and disposed in the ornamental part slot B3, the part object disposed in the human body part slot A3 is not cleared, whereby the model object in which the part object of "T-shirt 1" is seen around the neck portion of "uniform" is restructured, as shown in FIG. 11B.

Figure 12A:
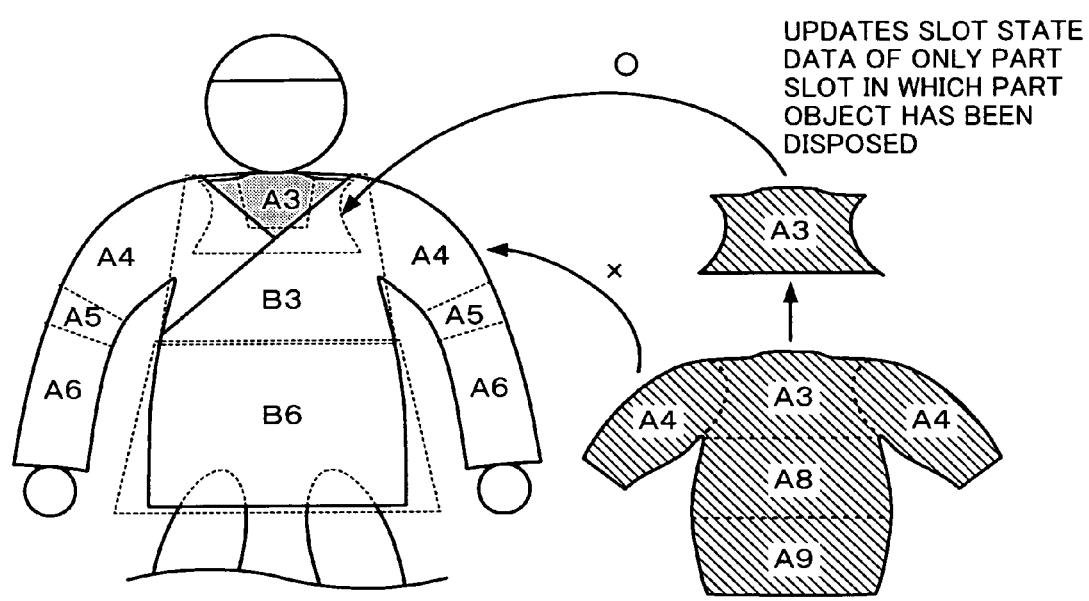
FIGS. 12A and 12B illustrate an example of changing a part object using a method according to one embodiment of the invention.
Figure 12B:
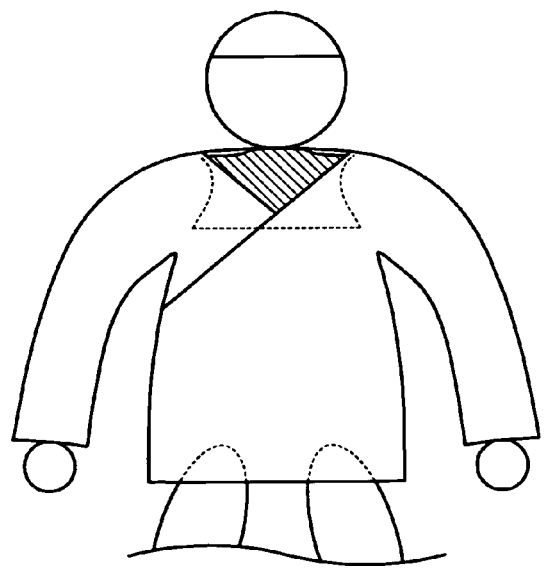

An example shown in FIGS. 12A and 12B illustrates the case of replacing the part set of "T-shirt" of the model object dressed in "uniform". For example, consider the case of replacing "T-shirt 1" with "T-shirt 2" when the part objects corresponding to the part set of "T-shirt 1" have been disposed. In this case, the slot state data is updated for only the human body part slot A3 of the human body part slots A3, A4, A8, and A9 corresponding to the part objects included in the part set of "T-shirt 2". Since the part object (JOB4-A4) of "uniform" given disposition priority over "T-shirt 2" has been disposed in the human body part slot A4, the slot state data of the human body part slot A4 is not updated. Since the disposition clear information which clears the human body part slots A8 to A10 is set for the part set of "uniform", the slot state data of the human body part slots A8 and A9 is not updated. Therefore, the model object after the clothes replacement as shown in FIG. 12B can be formed by additionally disposing only the part object (JOB2-A3) in the human body part slot A3 among the part objects (JOB2-A3/JOB2-A4/JOB2-A8/JOB2-A9) included in the part set of "T-shirt 2". This minimizes the amount of object data which forms the model object and reduces the time required for restructuring the model object.

Figure 13A:
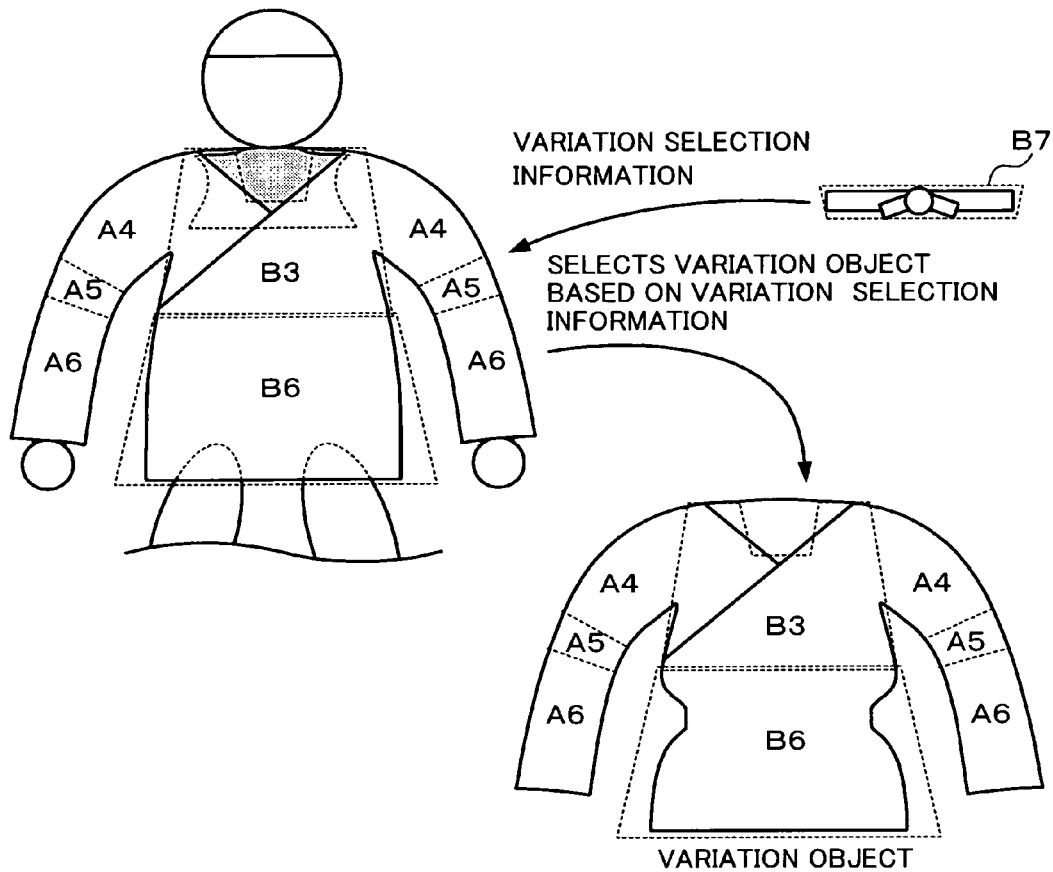
FIGS. 13A and 13B illustrate an example of changing a part object using a method according to one embodiment of the invention.
Figure 13B:
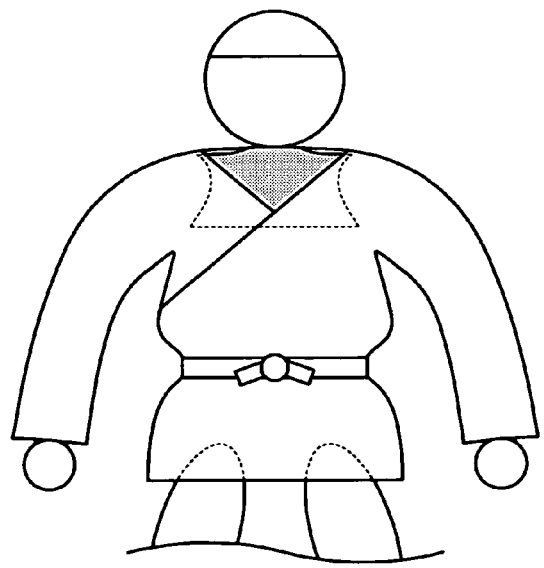

An example shown in FIGS. 13A and 13B illustrates the case of tying a belt around "uniform". In this case, "belt" (BOB-B7) disposed in the ornamental part slot B7 is given disposition priority over the waist portion (JOB4-B6) of "uniform" disposed in the ornamental part slot B6, and the ornamental part slot B7 overlaps the ornamental part slot B6. It is desirable that "uniform" be represented such that the waist portion is compressed when tying "belt". In this case, if "belt" conforming to the shape of the part object of the waist portion of "uniform" without "belt" is disposed, an unnatural model object is created. On the other hand, if the part object of the waist portion is compressed by "belt" to a large extent, an unnatural model object is also created due to inconsistency in shape between "uniform" and "belt". To deal with this problem, the variation selection information for replacing the part object included in the part set with lower disposition priority with the variation object is set for the part set of "belt", as shown in FIG. 5, and the slot state data of the human body part slots A4 to A6 and the ornamental part slots B3 and B6 corresponding to the part objects (JOB4-A4/JOB4-A5/JOB4-A6/JOB4-B3/JOB4-B6) included in the part set of "uniform" is updated based on the variation selection information. In this case, the variation objects (JOB4-A4a/JOB4-A5a/JOB4-A6a/JOB4-B3a/JOB4-B6a) of "uniform" set such that the part object having a shape compressed conforming to the shape of "belt" is disposed in the part slot B5 are selected, as shown in FIG. 13A, whereby the model object is formed using the variation object data of "uniform". As a result, the model object in which "belt" is tightened around the waist portion of "uniform" can be restructured, as shown in FIG. 13B.

Figure 14A:
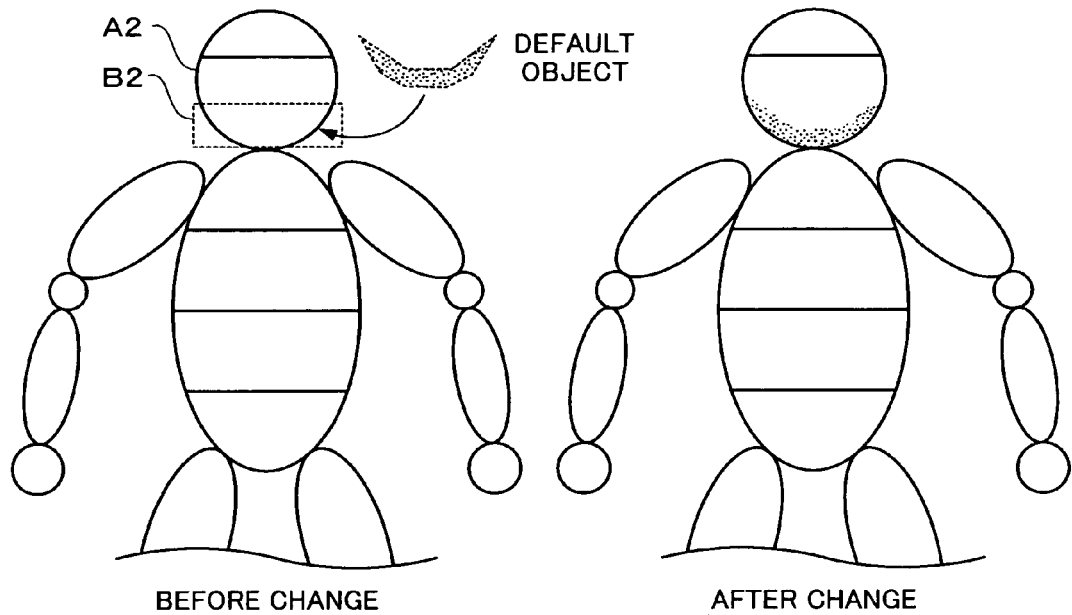
FIGS. 14A and 14B illustrate an example of changing a part object using a method according to one embodiment of the invention.
Figure 14B:
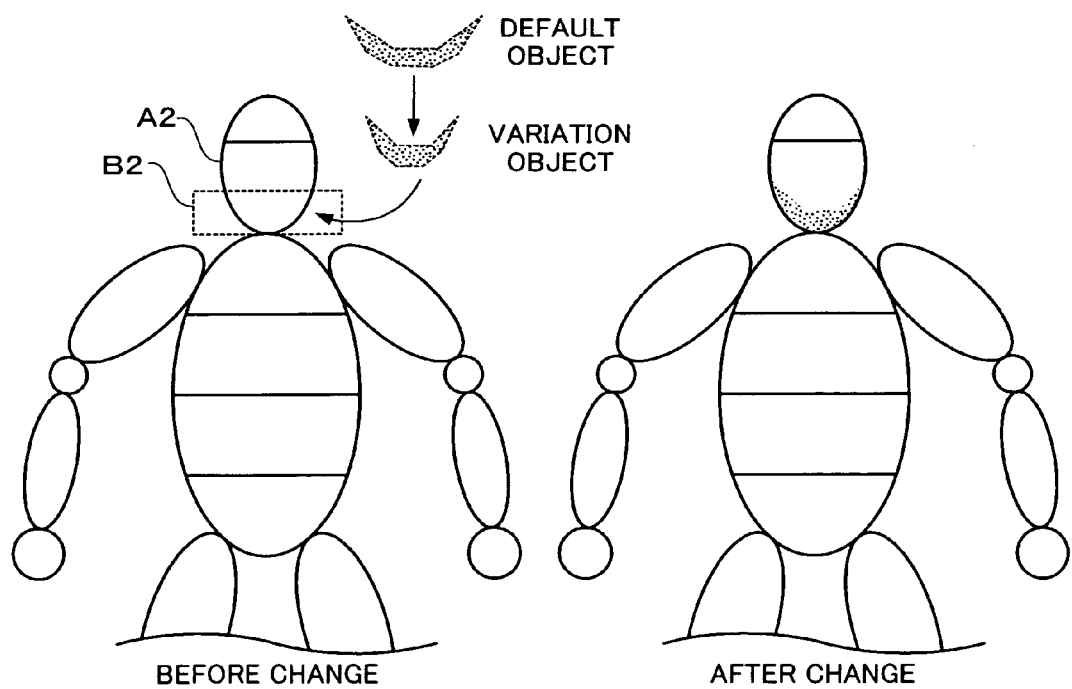

Consider the case of disposing the part object of "beard" on the face of the model object. For example, when disposing the part object of "stubbly beard" on the face part object, it is necessary for "stubbly beard" to conform to the contour of the face. In this embodiment, the slot monitor information is set for the part set of "beard", as shown in FIG. 5, and the variation selection information is set for selecting the variation data corresponding to the type of part object which has been disposed in the human body part slot A2 in which the part set of "face" set based on the slot monitor information is disposed. For example, a beard for an average face, a beard for a narrow face, and a beard for a plump face are provided, and, when the part object (FOB1-A2) of an average face (face 1) has been disposed in the human body part slot A2, the default object (WOB-B2) of the part object of the beard for an average face is disposed in the ornamental part slot B2, as shown in FIG. 14A. As shown in FIG. 14B, when the part object (FOB2-A2) of a narrow face (face 2) has been disposed in the human body part slot A2, the variation object (WOB-B2a) of the part object of the beard for a narrow face is disposed in the ornamental part slot B2. When the part object (FOB3-A2) of a plump face (face 3) has been disposed in the human body part slot A2, the variation object (WOB-B2b) of the part object of the beard for a plump face is disposed in the ornamental part slot B2 based on the variation selection information. This allows consistency in shape between the part objects to be maintained when forming the model object by overlapping the part objects.

3. Processing According to This Embodiment

Figure 15:
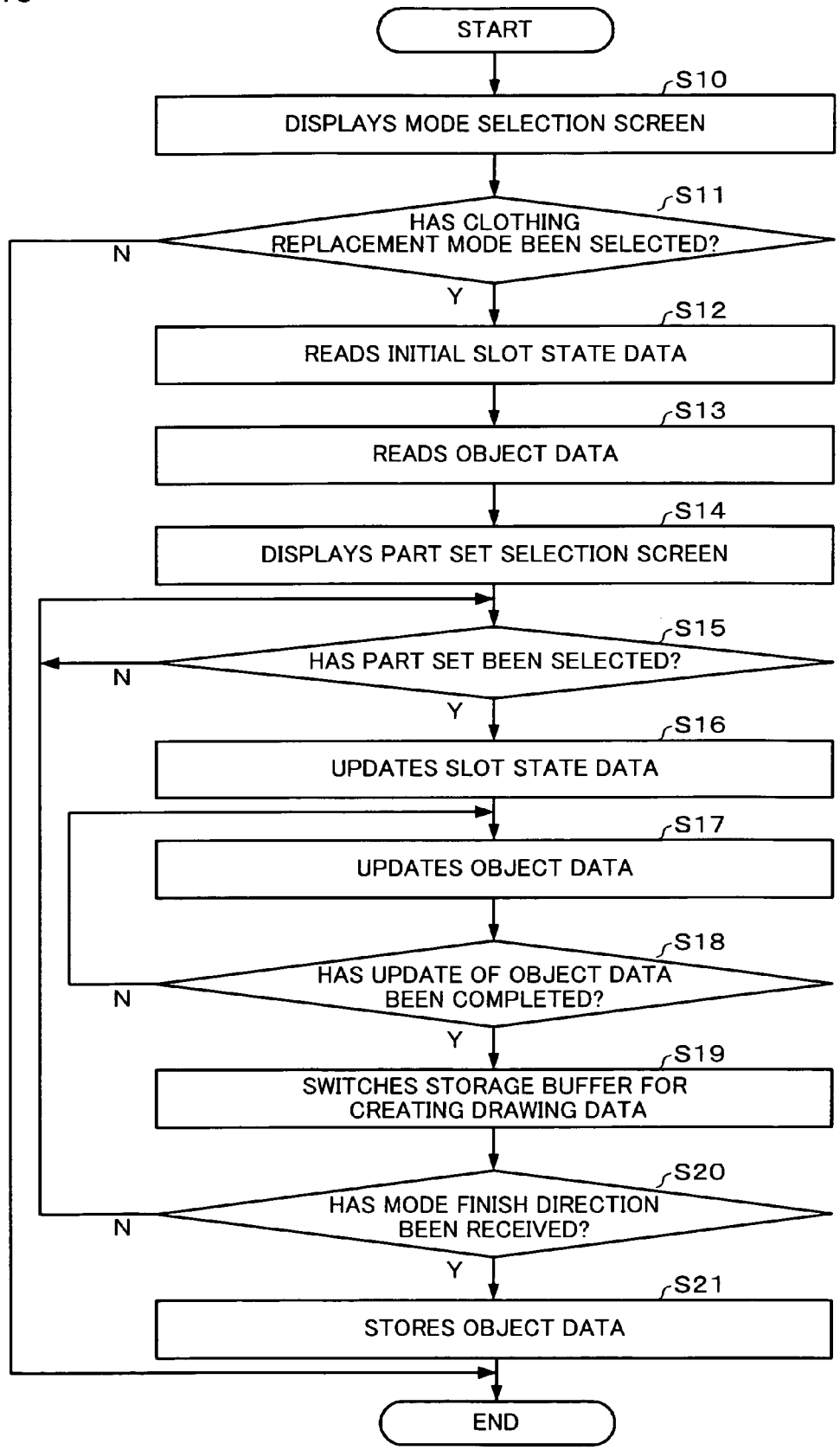
FIG. 15 is a flowchart showing a processing example according to one embodiment of the invention.
Figure 16:
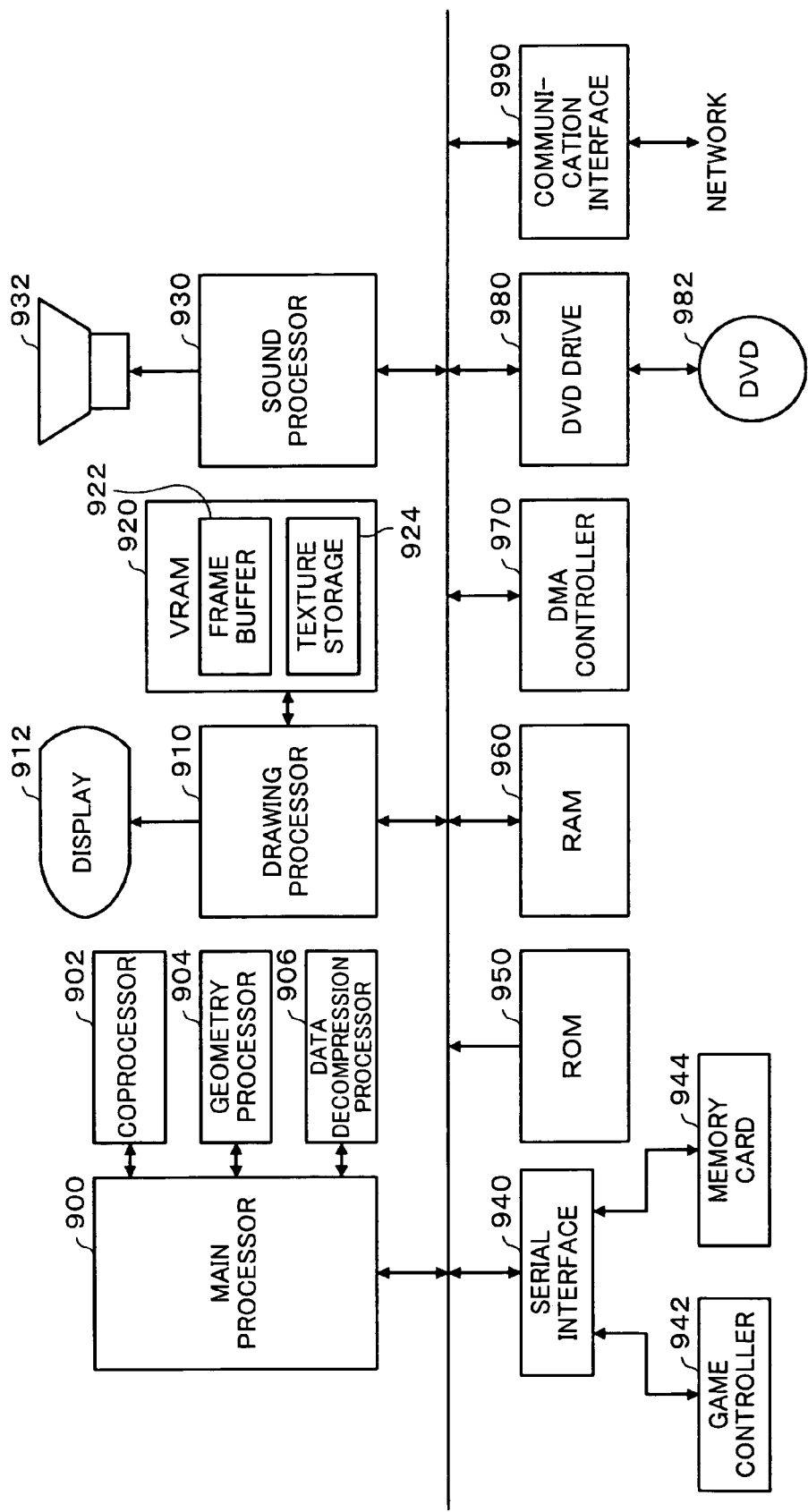
FIG. 16 is a block diagram showing a hardware configuration example.

A detailed processing example according to this embodiment is described below using a flowchart shown in FIG. 15.

Fist, a mode selection screen is displayed (step S10). When a clothing replacement mode is selected in the mode selection screen ("Y" in step S11), the initial slot state data is read (step S12). The object data of the part objects of the base model object is read into the object data storage section based on the read initial slot state data (step S13).

Then, a part set selection screen is displayed (step S14). Specifically, the image generation section draws the model object in the initial state in the drawing buffer based on the object data read into the object data storage section, and outputs the image of the model object to the display section together with a part set selection menu image.

When the part set has been selected ("Y" in step S15), the slot state data is updated (step S16). Specifically, whether or not to update the slot state data of each part slot is determined based on the relationship between the disposition priority of the part object which has been disposed and the disposition priority of the part object included in the selected part set, and the part object is disposed in part slot units to update the slot state data. When the variation selection information has been set for the selected part set, the variation object of the part object is optionally disposed in the part slot to update the slot state data. When the disposition clear information has been set for the selected part set, the part object disposed in the part slot which is set using the disposition clear information is cleared to update the slot state data.

Then, the object data is updated (step 817). Specifically, the model object is restructured. In more detail, the object data of the part object which is continuously displayed is copied from the drawing buffer (one storage buffer) into the update buffer (the other storage buffer) based on the updated slot state data, and the object data of the part object which must be additionally displayed is read into the update buffer to update the object data. This enables the object data which need not be displayed, that is, the object data of the part object which has been disposed in the part slot of which the part object has been cleared by the update of the slot state data to be removed (deleted). In the period in which the object data is updated, the image generation section generates the image of the model object based on the unupdated object data stored in the drawing buffer (i.e. storage buffer from which the object data is copied), and outputs the generated image to the display section.

When the update of the object data has been completed ("Y" in step S18), the storage buffer for creating the drawing data is switched (step S19). Specifically, the drawing buffer is set as the update buffer used during the subsequent update of the object data, and the update buffer is set as the drawing buffer. The image generation section thus acquires the updated object data, generates the image of the model object based on the updated object data, and outputs the generated image to the display section. When a finish direction has not been received ("N" in step S20), the processing from the steps S14 to S19 is repeatedly performed. When a finish direction has been received ("Y" in step S20), the latest object data is stored in a memory card (portable information storage device) (step S21) to finish the clothing replacement mode. The part object of the model object can be changed in this manner. In a game mode, the object data stored in the memory card is read, and the player plays the game using the model object formed by the part objects corresponding to the read object data as the player's character.

4. Hardware Configuration

FIG. 17 shows a hardware configuration example which can implement this embodiment. A main processor 900 operates based on a program stored in a DVD 982 (information storage medium), a program downloaded through a communication interface 990, a program stored in a ROM 950, or the like, and performs game processing, image processing, sound processing, and the like. A coprocessor 902 assists the processing of the main processor 900, and performs matrix calculation (vector calculation) at high speed. When matrix calculation is necessary for physical simulation to cause an object to move or make a motion, a program which operates on the main processor 900 directs (requests) the coprocessor 902 to perform the processing.

A geometry processor 904 performs geometric processing such as a coordinate transformation, perspective transformation, light source calculation, or curved surface generation based on instructions from a program operating on the main processor 900, and performs a matrix calculation at high speed. A data decompression processor 906 decodes compressed image data or sound data, or accelerates the decoding of the main processor 900. This enables a motion picture compressed according to the MPEG standard or the like to be displayed on an opening screen or a game screen.

A drawing processor 910 draws (renders) an object formed by a primitive surface such as a polygon or a curved surface. When drawing an object, the main processor 900 delivers drawing data to the drawing processor 910 by utilizing a DMA controller 970, and transfers a texture to a texture storage section 924, if necessary. The drawing processor 910 draws an object in a frame buffer 922 based on the drawing data and the texture while performing hidden surface removal utilizing a Z buffer or the like. The drawing processor 910 also performs alpha blending (translucent blending), depth queuing, MIP mapping, fog pressing, bilinear filtering, trilinear filtering, anti-aliasing, shading processing, or the like. When the image of one frame has been written into the frame buffer 922, the image (frame image) is displayed on the display 912.

A sound processor 930 includes a multi-channel ADPCM sound source or the like, generates game sound such as background music (BGM), effect sound, or voice, and outputs the generated game sound through a speaker 932. Data from a game controller 942 or a memory card 944 is input though a serial interface 940.

A system program or the like is stored in the ROM 950. In the case of an arcade game system, the ROM 950 functions as an information storage medium, and various programs are stored in the ROM 950. A hard disk may be used instead of the ROM 950. A RAM 960 functions as a work area for various processors. The DMA controller 970 controls DMA transfer between the processor and the memory. A DVD drive 980 (may be CD drive) accesses the DVD 982 (may be CD) in which a program, image data, sound data, or the like is stored. The communication interface 990 transfers data to the outside through a network (communication line or high-speed serial bus).

The processing of each section (each means) according to this embodiment may be realized by only hardware, or may be realized by a program stored in the information storage medium or a program distributed through the communication interface. Or, the processing of each section may be realized by hardware and a program.

When realizing the processing of each section according to this embodiment by hardware and a program, a program for causing the hardware (computer) to function as each section according to this embodiment is stored in the information storage medium. In more detail, the program directs each of the processors 902, 904, 906, 910, and 930 (hardware) to perform the processing, and transfers data to the processors, if necessary. The processors 902, 904, 906, 910, and 930 realize the processing of each section according to this embodiment based on the instructions and the transferred data.

The invention is not limited to the above-described embodiments, and various modifications can be made. For example, any term cited with a different term having broader or the same meaning at least once in this specification or drawings can be replaced by the different term in any place in this specification and drawings.

The method of updating the slot state data, the method of updating the object data, and the like are not limited to those described in the above-described embodiment, and methods equivalent to these methods are also included within the scope of the invention.

The invention may be applied to various games (e.g. fighting game, shooting game, robot fighting game, sport game, competitive game, role playing game, music playing game, and dance game). The invention may be applied to various image generation systems such as an arcade game system, consumer game system, large-scale attraction system in which a number of players participate, simulator, multimedia terminal, system board which generates a game image, and portable telephone.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A computer-readable medium embedded with a program used for generating an image, the program causing a computer to function as:
    an object data storage section which stores object data corresponding to each part object of a model object formed by a plurality of part objects;
    a slot state data storage section which stores a disposition state of the part object in a part slot provided corresponding to each of the part objects as slot state data;
    a disposition direction reception section which receives a disposition direction for the part object;
    a slot state update section which, when another part object has been disposed in the part slot corresponding to the part object for which the disposition direction has been issued, determines whether or not to update the slot state data of the part slot based on priority information which determines disposition priority of each of the part objects, and updates the slot state data based on a determination result; and
    an image generation section which acquires the object data from the object data storage section based on the updated slot state data, and generates an image of the model object based on the acquired object data.

2. The computer-readable medium embedded with a program as defined in claim 1,
    wherein, when the part object for which the disposition direction has been issued is given disposition priority over the other part object which has been disposed in the part slot corresponding to the part object, the slot state update section determines that the slot state data must be updated, and disposes the part object for which the disposition direction has been issued in the part slot in place of the other part object to update the slot state data.

3. The computer-readable medium embedded with a program as defined in claim 1,
    wherein, when the part object for which the disposition direction has been issued is not given disposition priority over the other part object which has been disposed in the part slot corresponding to the part object, the slot state update section determines that the slot state data must not be updated.

4. The computer-readable medium embedded with a program as defined in claim 1,
    wherein, when the part object for which the disposition direction has been issued is given disposition priority equal to that of the other part object which has been disposed in the part slot corresponding to the part object, the slot state update section determines that the slot state data must be updated, and disposes the part object for which the disposition direction has been issued in the part slot in place of the other part object to update the slot state data.

5. The computer-readable medium embedded with a program as defined in claim 1,
    wherein one or more of the part objects disposed in one or more of the part slots are provided as a part set;
    wherein the disposition priority of the part object included in the part set is set in part set units; and
    wherein the disposition direction reception section receives the disposition direction for the part object using the part set as a direction unit.

6. The computer-readable medium embedded with a program as defined in claim 5,
    wherein, when two or more of the part objects are included in the part set, the slot state update section determines whether or not to update the slot state data in part slot units corresponding to each of the part objects included in the part set, and updates the slot state data in part slot units.

7. A computer-readable medium embedded with a program used for generating an image, the program causing a computer to function as:
    an object data storage section which stores object data corresponding to each part object of a model object formed by a plurality of part objects;
    a slot state data storage section which stores a disposition state of the part object in a part slot provided corresponding to each of the part objects as slot state data;
    a disposition direction reception section which receives a disposition direction for the part object using a part set including one or more of the part objects disposed in one or more of the part slots as a direction unit;
    a slot state update section which updates the slot state data based on priority information which determines disposition priority of the part object included in the part set; and
    an image generation section which acquires the object data from the object data storage section based on the updated slot state data, and generates an image of the model object based on the acquired object data.

8. The computer-readable medium embedded with a program as defined in claim 5,
    wherein a lower-order position part slot in which a lower-order part object with lower disposition priority is disposed, and a higher-order position part slot in which a higher-order part object with higher disposition priority is disposed are provided;
    wherein variation selection information for selecting a variation object of one or more of the lower-order part objects included in a lower-order part set is set for a higher-order part set including one or more of the higher-order part objects; and
    wherein, when the variation selection information has been set for the higher-order part set for which the disposition direction has been issued, the slot state update section determines that the slot state data must be updated, and disposes the variation object of the lower-order part object in the lower-order part slot based on the variation selection information set for the higher-order part set to update the slot state data.

9. The computer-readable medium embedded with a program as defined in claim 5,
    wherein a lower-order position part slot in which a lower-order part object with lower disposition priority is disposed, and a higher-order position part slot in which a higher-order part object with higher disposition priority is disposed are provided;
    wherein variation selection information for selecting a variation object of the higher-order part object corresponding to one or more of the lower-order part objects included in a lower-order part set is set for a higher-order part set including one or more of the higher-order part objects; and wherein, when the variation selection information has been set for the higher-order part set for which the disposition direction has been issued, the slot state update section disposes the variation object of the higher-order part object selected corresponding to the lower-order part object disposed in the lower-order part slot in the higher-order part slot based on the variation selection information set for the higher-order part set to update the slot state data.

10. The computer-readable medium embedded with a program as defined in claim 1, wherein the object data storage section includes a first storage buffer and a second storage buffer;

wherein the program causes the computer to function as an object data update section which updates the object data stored in the first and second storage buffers based on the slot state data; and wherein, in a period in which one of the first and second storage buffers is updated by the object data update section, the image generation section outputs an image of the model object generated based on the object data stored in the other storage buffer to a display section.

11. A computer-readable information storage medium storing the program as defined in claim 1.

12. An image generation system which generates an image, the image generation system comprising:

an object data storage section which stores object data corresponding to each part object of a model object formed by a plurality of part objects;

a slot state data storage section which stores a disposition state of the part object in a part slot provided corresponding to each of the part objects as slot state data;

a disposition direction reception section which receives a disposition direction for the part object;

a slot state update section which, when another part object has been disposed in the part slot corresponding to the part object for which the disposition direction has been issued, determines whether or not to update the slot state data of the part slot based on priority information which determines disposition priority of each of the part objects, and updates the slot state data based on a determination result; and an image generation section which acquires the object data from the object data storage section based on the updated slot state data, and generates an image of the model object based on the acquired object data.

13. An image generation system which generates an image, the image generation system comprising:

an object data storage section which stores object data corresponding to each part object of a model object formed by a plurality of part objects;

a slot state data storage section which stores a disposition state of the part object in a part slot provided corresponding to each of the part objects as slot state data;

a disposition direction reception section which receives a disposition direction for the part object using a part set including one or more of the part objects disposed in one or more of the part slots as a direction unit;

a slot state update section which updates the slot state data based on priority information which determines disposition priority of the part object included in the part set; and an image generation section which acquires the object data from the object data storage section based on the updated slot state data, and generates an image of the model object based on the acquired object data.

14. An image generation method comprising:

storing object data corresponding to each part object of a model object formed by a plurality of part objects in an object data storage section;

storing a disposition state of the part object in a part slot provided corresponding to each of the part objects in a slot state data storage section as slot state data;

receiving a disposition direction for the part object;

determining, when another part object has been disposed in the part slot corresponding to the part object for which the disposition direction has been issued, whether or not to update the slot state data of the part slot based on priority information which determines disposition priority of each of the part objects, and updating the slot state data based on a determination result; and acquiring the object data from the object data storage section based on the updated slot state data, and generating an image of the model object based on the acquired object data.

15. An image generation method comprising:

storing object data corresponding to each part object of a model object formed by a plurality of part objects in an object data storage section;

storing a disposition state of the part object in a part slot provided corresponding to each of the part objects in a slot state data storage section as slot state data;

receiving a disposition direction for the part object using a part set including one or more of the part objects disposed in one or more of the part slots as a direction unit;

updating the slot state data based on priority information which determines disposition priority of the part object included in the part set; and acquiring the object data from the object data storage section based on the updated slot state data, and generating an image of the model object based on the acquired object data.

16. The computer-readable medium embedded with a program as defined in claim 7, wherein a lower-order position part slot in which a lower-order part object with lower disposition priority is disposed, and a higher-order position part slot in which a higher-order part object with higher disposition priority is disposed are provided;

wherein variation selection information for selecting a variation object of one or more of the lower-order part objects included in a lower-order part set is set for a higher-order part set including one or more of the higher-order part objects; and wherein, when the variation selection information has been set for the higher-order part set for which the disposition direction has been issued, the slot state update section determines that the slot state data must be updated, and disposes the variation object of the lower-order part object in the lower-order part slot based on the variation selection information set for the higher-order part set to update the slot state data.

17. The computer-readable medium embedded with a program as defined in claim 7, wherein a lower-order position part slot in which a lower-order part object with lower disposition priority is disposed, and a higher-order position part slot in which a higher-order part object with higher disposition priority is disposed are provided;

wherein variation selection information for selecting a variation object of the higher-order part object corresponding to one or more of the lower-order part objects included in a lower-order part set is set for a higher-order part set including one or more of the higher-order part objects; and wherein, when the variation selection information has been set for the higher-order part set for which the disposition direction has been issued, the slot state update section disposes the variation object of the higher-order part object selected corresponding to the lower-order part object disposed in the lower-order part slot in the higher-order part slot based on the variation selection information set for the higher-order part set to update the slot state data.

18. The computer-readable medium embedded with a program as defined in claim 7, wherein the object data storage section includes a first storage buffer and a second storage buffer;

wherein the program causes the computer to function as an object data update section which updates the object data stored in the first and second storage buffers based on the slot state data; and wherein, in a period in which one of the first and second storage buffers is updated by the object data update section, the image generation section outputs an image of the model object generated based on the object data stored in the other storage buffer to a display section.

19. A computer-readable information storage medium storing the program as defined in claim 7.

* * * * *